(12) United States Patent
Yasukawa et al.

(10) Patent No.: US 12,207,359 B2
(45) Date of Patent: Jan. 21, 2025

(54) TERMINAL, BASE STATION, SYSTEM, AND FEEDBACK METHOD

(71) Applicant: NTT DOCOMO, INC., Tokyo (JP)

(72) Inventors: Shimpei Yasukawa, Tokyo (JP); Kazuaki Takeda, Tokyo (JP); Hiroki Harada, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 293 days.

(21) Appl. No.: 17/237,691

(22) Filed: Apr. 22, 2021

(65) Prior Publication Data

US 2021/0243841 A1 Aug. 5, 2021

Related U.S. Application Data

(63) Continuation of application No. 15/525,087, filed as application No. PCT/JP2015/081566 on Nov. 10, 2015, now abandoned.

(30) Foreign Application Priority Data

Nov. 14, 2014 (JP) .................................. 2014-232135

(51) Int. Cl.
*H04W 92/18* (2009.01)
*H04L 1/1829* (2023.01)
(Continued)

(52) U.S. Cl.
CPC ............ *H04W 92/18* (2013.01); *H04L 1/1864* (2013.01); *H04L 1/1887* (2013.01); *H04L 1/189* (2013.01);
(Continued)

(58) Field of Classification Search
CPC ...... H04W 92/18; H04W 28/04; H04W 72/04; H04W 72/1289; H04L 1/189; H04L 1/1887; H04L 1/1864; H04L 1/1896
See application file for complete search history.

(56) References Cited

U.S. PATENT DOCUMENTS

2013/0322413 A1 12/2013 Pelletier et al.
2014/0241262 A1* 8/2014 Novak .................. H04W 72/23
370/329

(Continued)

FOREIGN PATENT DOCUMENTS

WO 2013/181807 A1 12/2013
WO 2014/167883 A1 10/2014

OTHER PUBLICATIONS

International Search Report issued in PCT/JP2015/081566 mailed on Jan. 26, 2016 (5 pages).
(Continued)

*Primary Examiner* — Charles T Shedrick
(74) *Attorney, Agent, or Firm* — Osha Bergman Watanabe & Burton LLP

(57) ABSTRACT

A terminal is disclosed that includes a receiver that receives sidelink control information and data in sidelink and a transmitter that transmits a feedback signal corresponding to the data on a sidelink feedback channel. The transmitter determines a resource for transmitting the feedback signal based on a correspondence between a resource of the data and a resource for feedback. In other aspects, a base station, systems, and feedback methods are also disclosed.

14 Claims, 28 Drawing Sheets

(51) Int. Cl.
    *H04L 1/1867* (2023.01)
    *H04W 28/04* (2009.01)
    *H04W 72/04* (2023.01)
    *H04W 72/23* (2023.01)

(52) U.S. Cl.
    CPC .......... *H04L 1/1896* (2013.01); *H04W 28/04* (2013.01); *H04W 72/04* (2013.01); *H04W 72/23* (2023.01)

(56) References Cited

U.S. PATENT DOCUMENTS

| | | | |
|---|---|---|---|
| 2014/0321293 A1 | 10/2014 | Hwang | |
| 2016/0021566 A1 | 1/2016 | Kimura et al. | |
| 2016/0135084 A1* | 5/2016 | Yi | H04W 12/037 370/466 |
| 2017/0006583 A1* | 1/2017 | Tavildar | H04B 7/2615 |
| 2017/0019882 A1* | 1/2017 | Nimbalker | H04W 72/23 |
| 2017/0019883 A1* | 1/2017 | Nimbalker | H04W 72/0446 |
| 2018/0176892 A1* | 6/2018 | Kim | H04W 52/04 |
| 2020/0412508 A1* | 12/2020 | Wu | H04L 1/1854 |

OTHER PUBLICATIONS

Written Opinion of the International Searching Authority issued in PCT/JP2015/081566 mailed on Jan. 26, 2016 (4 pages).

3GPP TR 36.843 V12.0.1; "3rd Generation Partnership Project; Technical Specification Group Radio Access Network; Study on LTE Device to Device Proximity Services; Radio Aspects; (Release 12)"; Mar. 2014 (50 pages).

3GPP TSG-RAN WG1 Meeting #73; R1-132188; InterDigital; "D2D Communication in LTE"; Fukuoka, Japan; May 20-24, 2013 (7 pages).

3GPP TSG RAN WG1 Meeting #78; R1-143076; Samsung; "Control information needed for D2D broadcast communication"; Dresden, Germany; Aug. 18-22, 2014 (8 pages).

Office Action issued in counterpart Japanese Patent Application No. 2016-559053, mailed on Jul. 9, 2019 (7 pages).

Office Action issued in Chinese Application No. 201580057631.X; Dated Sep. 23, 2019 (15 pages).

Office Action issued in counterpart Japanese Patent Application No. 2019-209844, mailed on Nov. 10, 2020 (8 pages).

\* cited by examiner

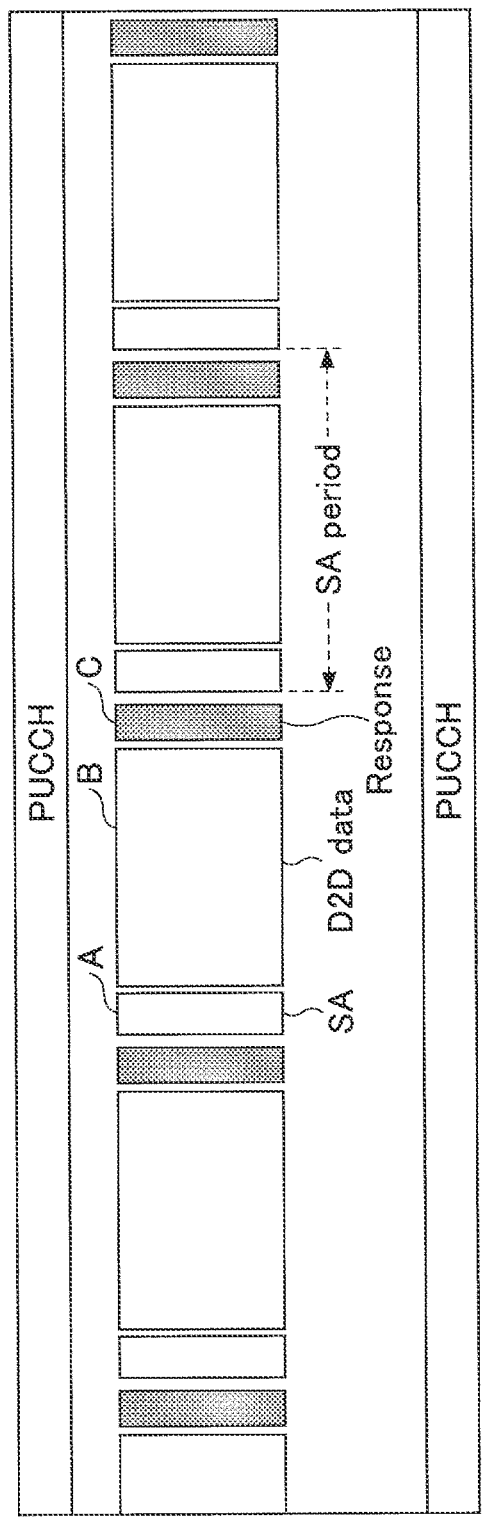

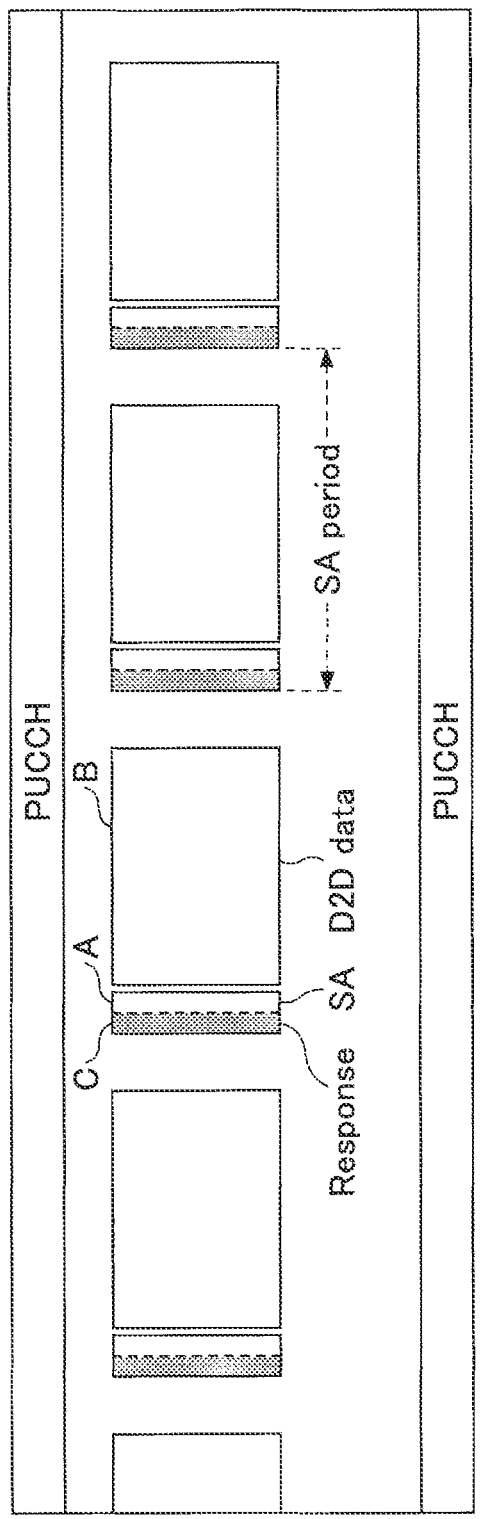

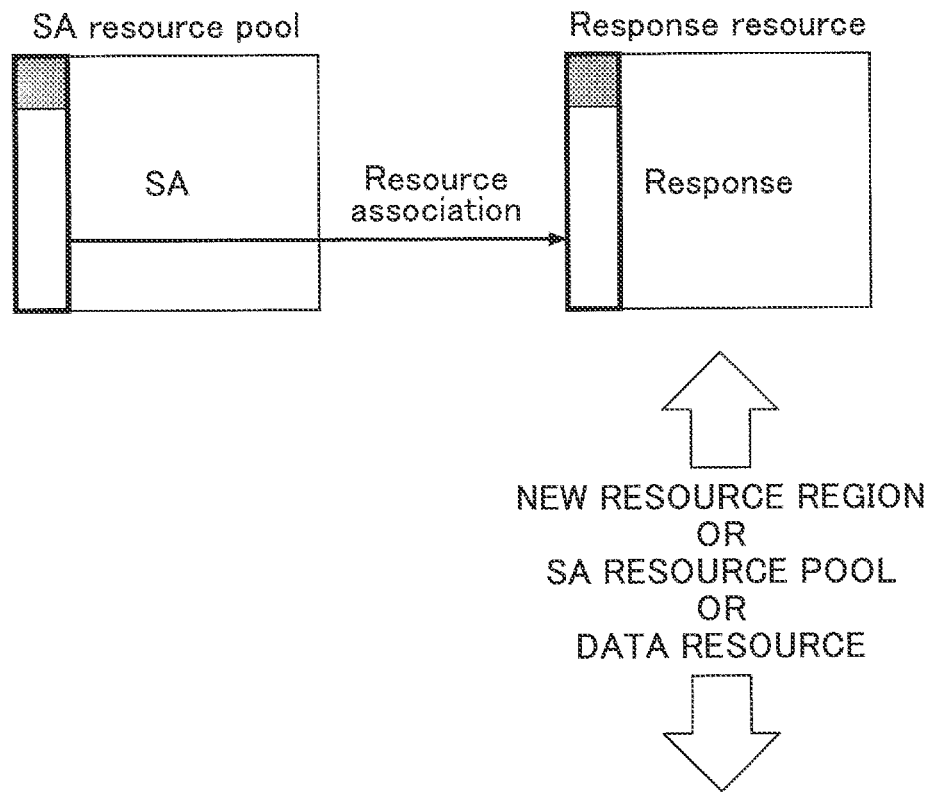
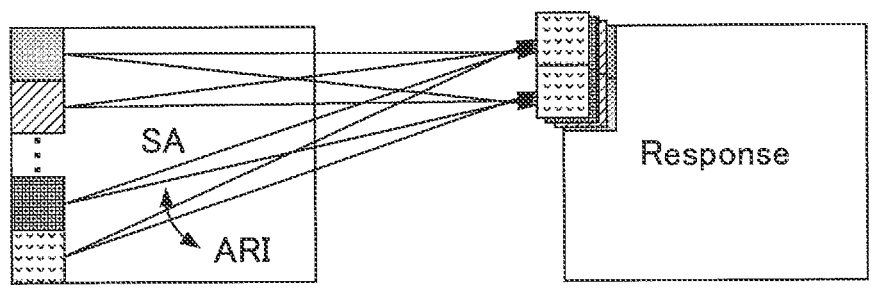

FIG.9
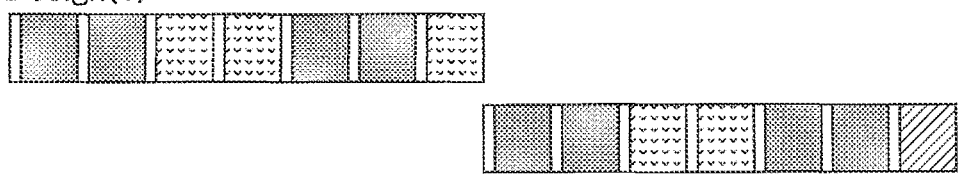
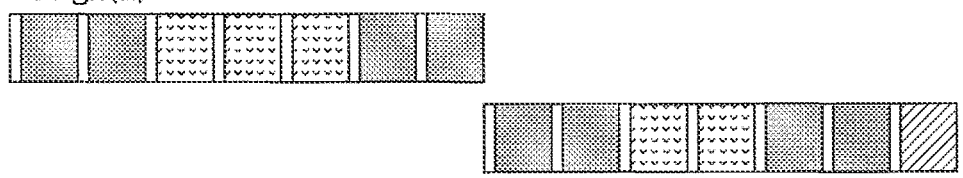
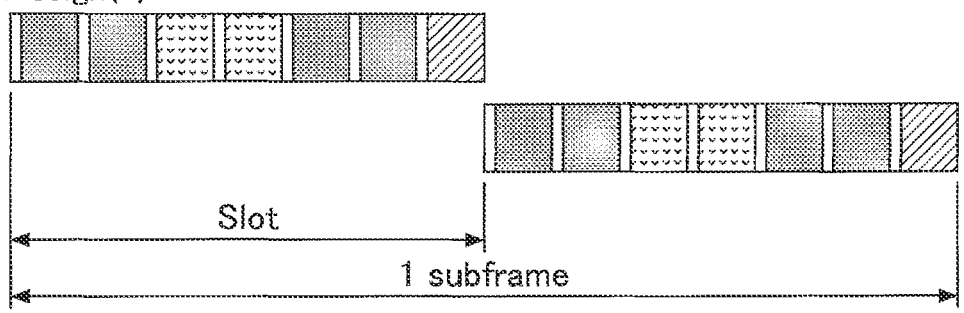
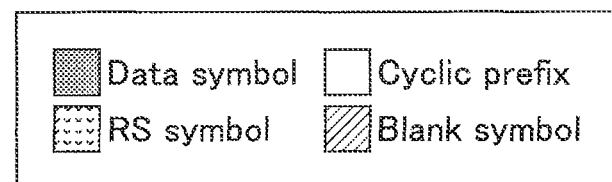

FIG. 11

| | DMRS base sequence | | | DMRS | |
|---|---|---|---|---|---|
| | Group hopping | Sequence hopping | Delta shift | Cell ID | CS | OCC |
| Feedback | Enabled | Disabled | 0 | Fixed or By L1 ID and/or HARQ related ID/index and/or SCI resource index and/or feedback resource index | By L1 ID and/or HARQ related ID/index and/or SCI resource index | By L1 ID and/or HARQ related ID/index and/or SCI resource index |

A ··· (Group hopping Enabled row)
B ··· (CS / OCC DMRS block)

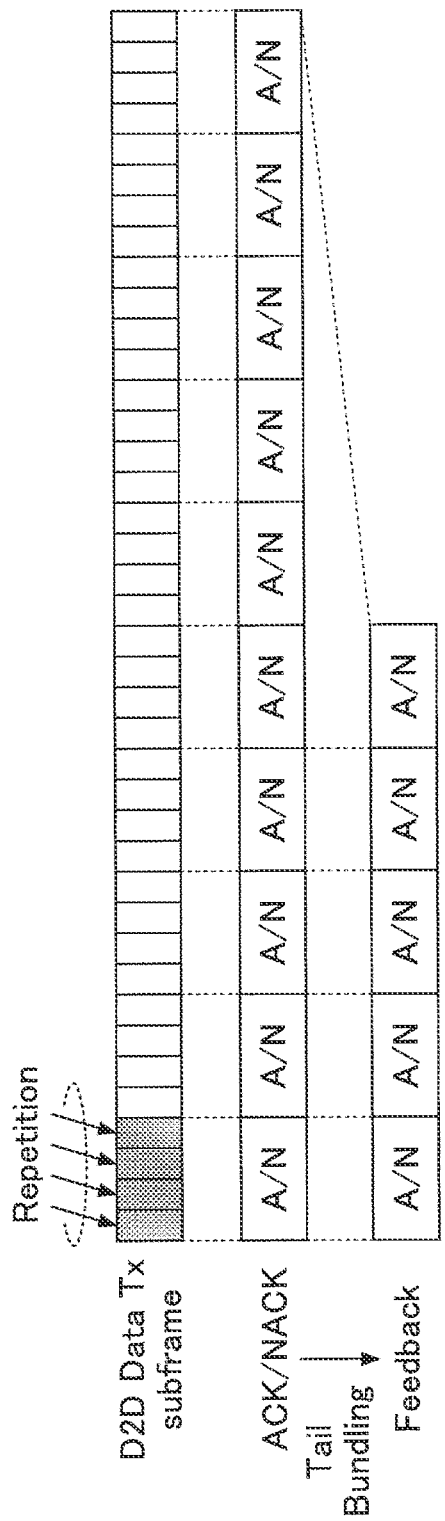

FIG.13

| ACK | SINR margin(dB) | Ch1 | Ch2 |
|---|---|---|---|
| N/D | −6 | +1 | |
| N/D | −3 | −1 | |
| A | 0 | | +1 |
| A | 5 | | +j |
| A | 10 | | −1 |
| A | 20 | | −j |
| | | NACK | ACK |

TERMINAL, BASE STATION, SYSTEM, AND FEEDBACK METHOD

CROSS-REFERENCE TO RELATED APPLICATIONS

This application is a continuation application and, thereby, claims benefit under 35 U.S.C. § 120 to U.S. application Ser. No. 15/525,087, filed on May 8, 2017, titled "USER EQUIPMENT, FEEDBACK CONTROL METHOD, AND RETRANSMISSION CONTROL METHOD," which is a U.S. National Stage Application of PCT Application No. PCT/JP2015/081566, filed on Nov. 10, 2015, which claims priority to Japanese Patent Application No. 2014-232135, filed on Nov. 14, 2014. The contents of the priority applications are incorporated by reference in their entirety.

TECHNICAL FIELD

The present invention relates to D2D communication (user equipment to user equipment communication), and particularly relates to a technique for user equipment UE that receives a D2D signal to transmit a feedback signal in the D2D communication. Note that the D2D communication may also be referred to as side link (sidelink) communication.

BACKGROUND ART

In the current mobile communication system, such as LTE, it is common that communication between user equipment UE and user equipment UE is performed through a base station eNB by performing communication between the user equipment UE and the base station eNB; and, in recent years, various techniques have been proposed for the D2D communication (which is referred to as "D2D," hereinafter) in which communication is directly performed between user equipment UE and user equipment UE.

In particular, for D2D in LTE, the following have been proposed: "Communication (communication)" for performing data communication, such as a push-type call, between user equipment UE and user equipment UE; and "Discovery (detection)" (see Non-Patent Document 1) for causing receiving user equipment to detect user equipment Transmitting UE by transmitting, from the user equipment UE, a discovery signal (discovery signal) including its own ID, an application ID, etc.

For the D2D to be specified in LTE, it has been proposed that each user equipment UE utilizes a part of an uplink resource that has already been specified as a resource for uplink signal transmission from the user equipment UE to a base station eNB. Additionally, it has been proposed that a base station eNB assists for allocating a resource to be used in D2D. An overview of the currently proposed resource allocation for the D2D communication in LTE is described below (see Non-Patent Document 1).

For the "Discovery," as illustrated in FIG. 1A, a resource pool of Discovery signals is reserved for each Discovery period; and user equipment UE transmits a Discovery signal within the resource pool. More specifically, there are Type 1, Type 2a, and Type 2b. For Type 1, user equipment UE autonomously selects a transmission resource from a resource pool. For Type 2a, a specific resource in a resource pool is to be dynamically allocated by a (E) PDCCH. For Type 2B, a semi-persistent resource is to be allocated by higher-layer signaling (e.g., a RRC signal).

For the "Communication," as illustrated in FIG. 1B, it has been studied to periodically reserve a resource pool for SA/Data transmission. SA is an abbreviation of Scheduling Assignment; and transmitting UE reports a resource for Data transmission to a receiving side with a resource selected from the SA resource pool, and transmits Data with the resource for Data transmission. This signal for reporting the resource may be referred to as SA. For the "Communication," more specifically, there are Mode 1 and Mode 2. For Mode 1, a resource is to be dynamically allocated by a (E) PDCCH to be transmitted from a base station eNB to user equipment UE. Furthermore, for allocation of a (E) PDCCH, a semi-persistent resource allocation (SPS: Semi-persistent scheduling) has been proposed. For Mode 2, user equipment UE autonomously selects a transmission resource from the SA resource pool. Note that, for the resource pool, that of reported by a SIB, or a predefined one is to be used.

FIG. 1C specifically illustrates an example where a D2D resource pool is multiplexed with WAN resources by FDM/TDM. As illustrated in a signal configuration of FIG. 1C, signal configurations based on the PUSCH are respectively adopted for SA and Data.

PRIOR ART DOCUMENT

Non-Patent Document

Non-Patent Document 1: 3GPP TR 36.843 V12.0.1 (2014-03)

SUMMARY OF INVENTION

Problem to be Solved by the Invention

For the D2D communication in Rel-12 of LTE, broadcast (Broadcast) is supported, and, for group cast (Group-cast) and unicast (Unicast), only L1 ID and MAC source/destination ID are specified; and, in Rel-13, detailed functions of Group-cast and Unicast are to be specified.

Furthermore, for the D2D of Rel-12, only Repetition is supported, which is for repeatedly transmitting SA/Data etc.; and retransmission based on HARQ feedback and CSI feedback are not supported. Accordingly, retransmission for a case where data is not delivered, etc., is to be performed by a higher layer, for example.

However, especially for the Unicast, the control depending on the retransmission by the higher layer may not be efficient from a perspective of transmission latency/transmission overhead; and, without feedback, enhancement of frequency utilization efficiency by Link adaptation may not be properly achieved. Consequently, an achievable data rate is low, and it is not suitable for broadband communication.

The present invention is achieved in view of the above-described point, and an object is to provide a technique for allowing feedback and retransmission to be performed between user equipment and user equipment in a mobile communication system supporting the D2D communication.

Means for Solving the Problem

According to an embodiment of the present invention, there is provided user equipment to be used as receiving user equipment in a mobile communication system supporting D2D communication, the user equipment including a feedback unit that receives a D2D signal from transmitting user equipment, and that transmits, to the transmitting UE, a feedback signal with respect to the D2D signal by using a predetermined resource; and a receiver that receives a retransmission D2D signal transmitted from the transmitting UE based on the feedback signal.

Furthermore, according to an embodiment of the present invention, there is provided user equipment to be used as transmitting UE in a mobile communication system supporting D2D communication, the user equipment including a receiver that receives, from receiving user equipment, a feedback signal with respect to a D2D signal transmitted to the receiving UE; and a transmitter that transmits, to the receiving UE, a retransmission D2D signal with respect to the D2D signal, based on the feedback signal.

Furthermore, according to an embodiment of the present invention, there is provided a feedback control method to be executed by user equipment that is used as receiving user equipment in a mobile communication system supporting D2D communication, the feedback method including a feedback step of receiving a D2D signal from transmitting UE, and transmitting, to the transmitting UE, a feedback signal with respect to the D2D signal by using a predetermined resource; and a reception step of receiving a retransmission D2D signal transmitted from the transmitting UE, based on the feedback signal.

Furthermore, according to an embodiment of the present invention, there is provided a retransmission control method to be executed by user equipment that is used as transmitting UE in a mobile communication system supporting D2D communication, the retransmission control method including a reception step of receiving, from receiving user equipment, a feedback signal with respect to a D2D signal transmitted to the receiving UE; and a transmission step of transmitting, to the receiving UE, a retransmission D2D signal with respect to the D2D signal, based on the feedback signal.

Advantage of the Invention

According to embodiments of the present invention, there is provided a technique for allowing feedback and retransmission to be performed between user equipment and user equipment in a mobile communication system supporting the D2D communication.

BRIEF DESCRIPTION OF DRAWINGS

FIG. 3A is a diagram illustrating an example of a channel for feedback;
FIG. 3B is a diagram illustrating an example of a channel for feedback;
FIG. 8A is a diagram illustrating an example of allocation of a feedback resource;
FIG. 8B is a diagram illustrating an example of allocation of a feedback resource;

FIG. 9 is a diagram illustrating an example of a symbol mapping configuration based on PUCCH format 1;
FIG. 11 is a diagram illustrating details of DM-RS in a PUCCH-based channel configuration;
FIG. 12C is a diagram illustrating the bundling of the ACK/NACK feedback;
FIG. 13 is a diagram illustrating an example of mapping of feedback information to a channel.

EMBODIMENTS OF THE INVENTION

Figure 1A:
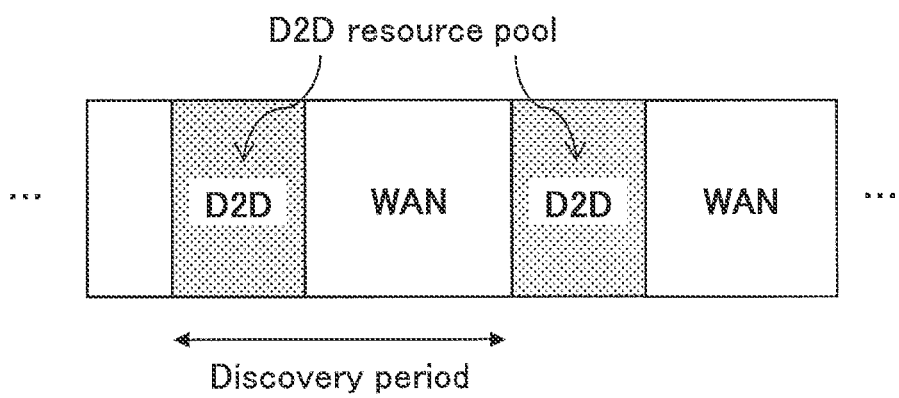
FIG. 1A is a diagram for illustrating D2D communication.
Figure 1B:
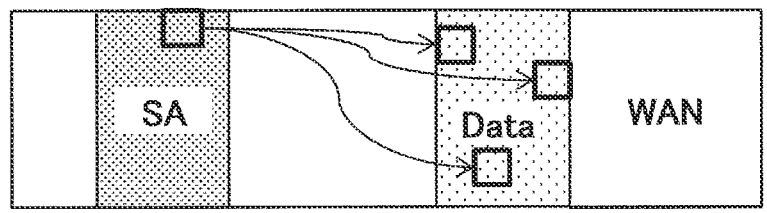
FIG. 1B is a diagram for illustrating the D2D communication.
Figure 1C:
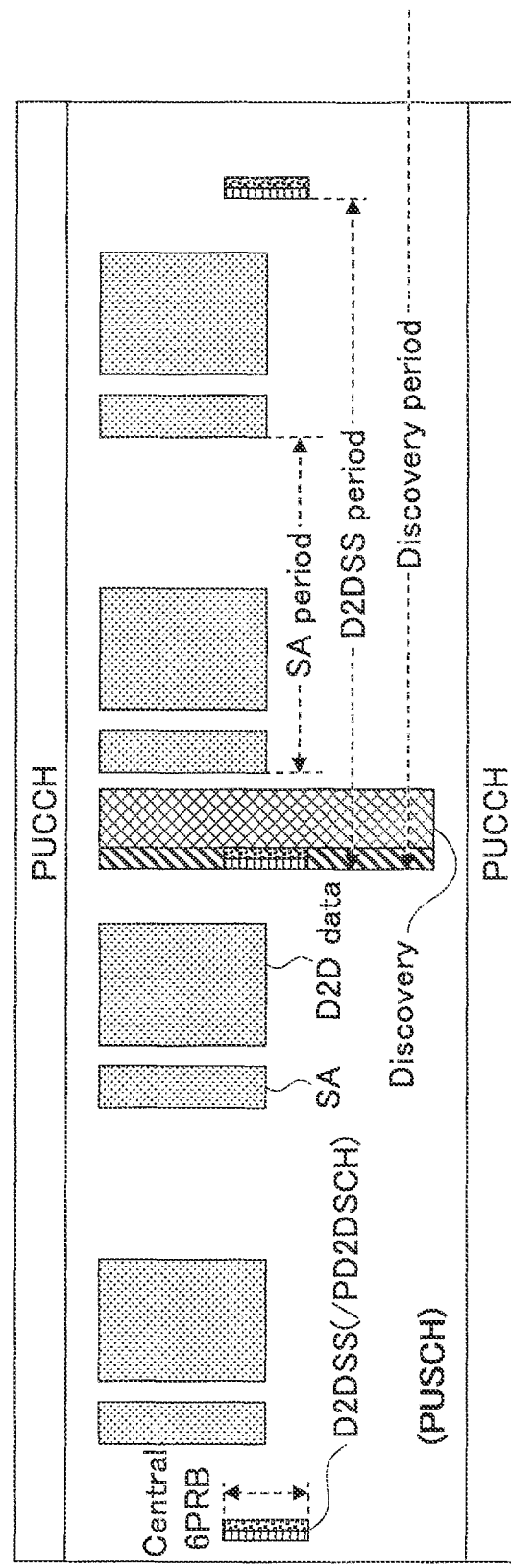
FIG. 1C is a diagram for illustrating the D2D communication.

Embodiments of the present invention are described below by referring to the drawings. The embodiments described below are merely examples, and embodiments in which the present invention is applied are not limited to the embodiments described below. For example, as a mobile communication system according to the embodiments, a system based on a scheme conforming to LTE is assumed; however, the present invention is not limited to LTE, and is also applicable to another scheme. Furthermore, in the following, feedback with respect to Data in Communication is mainly described; however, the feedback technique according to the present invention is not limited to Data, and is generally applicable to D2D signals. Furthermore, in the present specification and the scope of the claims, "LTE" is used in a broad sense including communication schemes corresponding to 3GPP Rel-12, 13, or after that.

In the following description, retransmission based on feedback, such as NACK, is denoted as "transmission," and repetition of transmission is denoted as "Repetition." Furthermore, as described below, control information transmitted in a SA resource pool can be referred to as SCI (Sidelink Control Information); however, the term "SCI" is mainly used for "feedback SCI" and "scheduling SCI" that is specifically described as a SA provided with a new format, and the term "SA" is mainly used for a SA, for convenience. However, even if it is described as "SA," it is not limited to existing SAs.

Furthermore, ACK/NACK, CSI, etc. are collectively referred to as feedback signals. The meaning of a feedback signal also includes a SA for cases where ACK/NACK, CSI, etc. are transmitted by Data.

(System Configuration)

Figure 2:
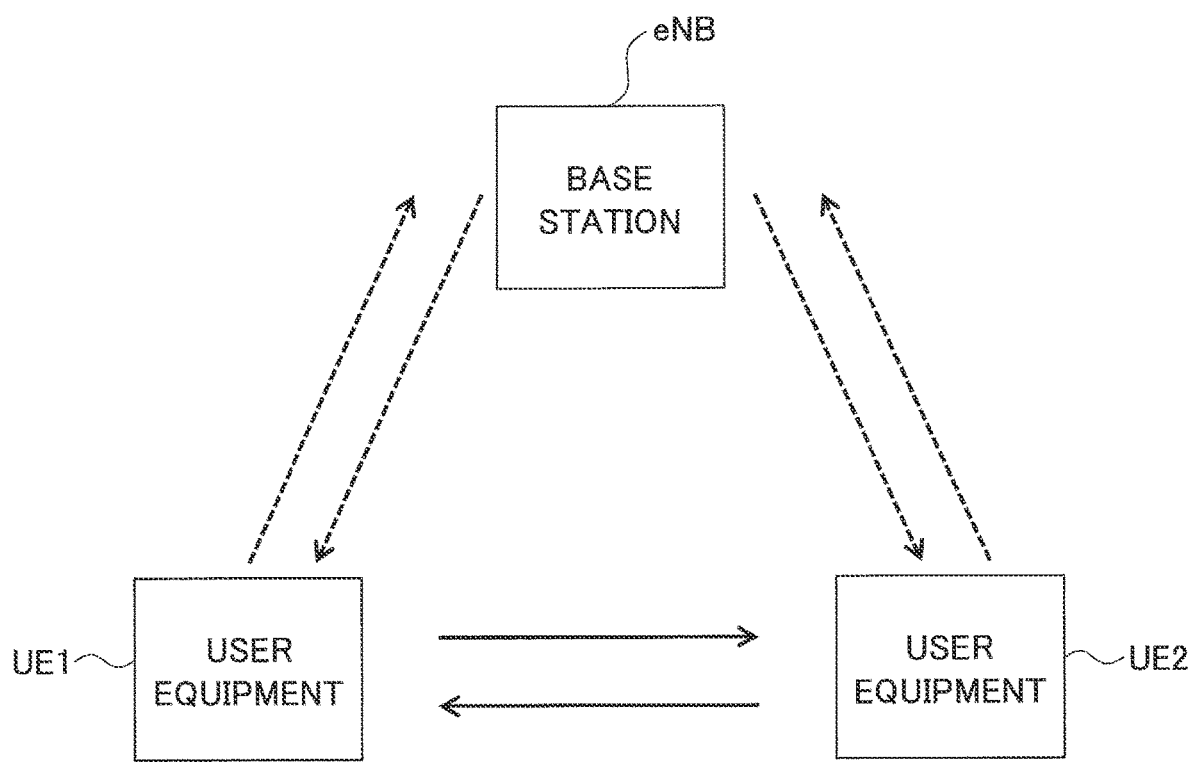
FIG. 2 is a configuration diagram of a system according to an embodiment of the present invention.

FIG. 2 is a diagram illustrating an example of a configuration of a mobile communication system according to an embodiment (which is common among embodiments) of the present invention. As illustrated in FIG. 2, the communication system according to the embodiment is a cellular communication system in which user equipment UE 1 and user equipment UE 2 are under the control of a base station eNB. Each of the user equipment UE 1 and UE 2 is provided with a D2D communication function, so that D2D communication can be performed between the user equipment UE 1 and UE 2. Furthermore, the user equipment UE 1 and the user equipment UE 2 are respectively capable of performing usual cellular communication with the base station eNB; and are respectively capable of receiving resource allocation for the D2D communication from the base station eNB.

FIG. 2 illustrates that the user equipment UE 1 and the user equipment UE 2 are within coverage of the base station eNB; however, this is an example, and the present invention can be implemented even if user equipment UE is outside coverage of a base station eNB. In the following, the user equipment UE 1 and the user equipment UE 2 are collectively denoted as user equipment UEs or UEs. Furthermore, user equipment UE at a side of transmitting SA/Data (the side of receiving feedback) is denoted as a transmitting UE; and user equipment UE at a side of receiving it (the side of transmitting the feedback) is denoted as a receiving UE.

In the following, a first embodiment, a second embodiment, and a third embodiment are described. In the first embodiment, a technique for performing feedback of ACK/NACK and/or reception quality (CSI: Channel State Information) with respect to transmission Data is described. In the second embodiment, a technique for retransmission at a time of Mode 1 resource allocation is described. In the third embodiment, feedback setting and switching of a feedback type are described.

First Embodiment

Now, the first embodiment is described. In the following, resource configuration examples 1 through 3 for feedback are described.

<Resource Configuration Example 1 for Feedback>

A resource group dedicated for feedback (which is referred to as channels for feedback) is defined for an example 1 of a resource configuration, as a resource for transmitting a feedback signal from the receiving UE to the transmitting UE in the D2D communication; and the feedback channels are to be used. By using the feedback channels, feedback with low latency can be achieved.

FIG. 3A and FIG. 3B illustrate examples of resource configurations of the feedback channels. In the example of FIG. 3A, the hatched resource pool is defined as the feedback channels. In FIG. 3A, as an example, one resource pool of the feedback channels is indicated as "Response."

As illustrated in FIG. 3A, in this example, the resource pool of the feedback channels is arranged after a resource pool for Data transmission (temporally later) and prior to a SA resource pool (temporally before). For example, after the transmitting UE transmits SA/Data to the receiving UE using resources in the resource pools indicated by A and B, the receiving UE transmits a feedback signal to the transmitting UE by using a resource in the resource pool indicated by C, which is a feedback resource up to the subsequent SA resource pool.

Note that the feedback channels (the resource pool for feedback) may be configured between the start of DFN/SFN (a system frame number) and a subframe specified by a SA offset indicator. By such a configuration, an SA/Data transmission resource pool that is compatible with a Rel-12 UE can be defined.

Furthermore, a resource for a feedback channel may be configured as illustrated in FIG. 3B. In the example of FIG. 3B, the SA resource pool is time-divided, the first half is used as feedback channels, and the latter half is used for SA transmission.

Furthermore, the resource pool for feedback may be configured, for example, by a base station eNB by using system information (SIB) for each UE within coverage; and, as the contents of the configuration at that time, there are, for example, assignment of resource blocks (RBs) of the resource pool, subframes, periods, and so forth. Furthermore, the SA resource pool/the Data resource pool/the feedback resource pool for Communication may be mapped to be one-to-one; and the Discovery resource pool/the feedback resource pool for Discovery may be mapped to be one-to-one.

Furthermore, for outside the coverage, a feedback resource pool may be configured in the UE in advance; and the UE may use the feedback resource pool when it is outside the coverage.

Note that, in the resource configuration example 1, the base station eNB may explicitly allocate, to the UE, a resource (e.g., a time/frequency position) for the receiving UE to transmit a feedback signal by UE dedicated signaling (examples: PDCCH/SCH, RRC signaling, etc.), for example. Especially, as described later, when the base station eNB is to receive a feedback signal from the UE, it is desirable to explicitly allocate the resource in this manner.

Furthermore, the transmitting UE may allocate, to the receiving UE, a resource (a time/frequency position) for transmitting a feedback signal by the receiving UE. This allocation may be explicitly performed, for example, by using the SA, or may be implicitly performed.

As an example of implicit allocation, a correspondence (mapping) between a resource position of SA/Data and a resource position for feedback may be defined in advance; and the receiving UE may determine a feedback resource based on the resource position of the received SA/Data, and may transmit a feedback signal by the feedback resource. Furthermore, a correspondence (mapping) between a resource position of Discovery and a position of a feedback resource may be defined in advance; and the receiving UE may determine a feedback resource based on a resource position of the received Discovery, and may transmit a feedback signal by the feedback resource.

Furthermore, in addition to above, the receiving UE may, for example, voluntarily (e.g., randomly) select a resource in a configured feedback resource pool to transmit a feedback signal.

<Resource Configuration Example 2 for Feedback>

In the resource configuration example 2 for feedback, a resource in the SA resource pool is used as a resource for the receiving UE to transmit a feedback signal to the UE at the transmitting side. More specifically, new SCI is defined, and the SCI is transmitted as a feedback signal. Here, the SCI is an abbreviation of Sidelink Control Information, which means control information in the SA resource pool. The signal of the SA, which is described in the part of the background art, is an example of the SCI; and, since scheduling is performed, it can be referred to as the scheduling SCI. Note that "Sidelink" means the D2D communication.

The SCI used for feedback is referred to as feedback SCI (Feedback SCI). The receiving UE may only report a feedback signal, such as ACK/NACK/SCI, etc., to the transmitting UE by using the feedback SCI; or may report, in addition to the feedback signal, Index information for explicitly reporting a correspondence (the feedback is for which Data) to initial transmission Data (Data which is not for retransmission), which becomes the target of the feedback.

In this manner, by transmitting feedback signals by using resources in the SA resource pool, the HARQ control can be implemented without defining a new resource pool, so that an increase in overhead due to feedback can be avoided.

Figure 4:
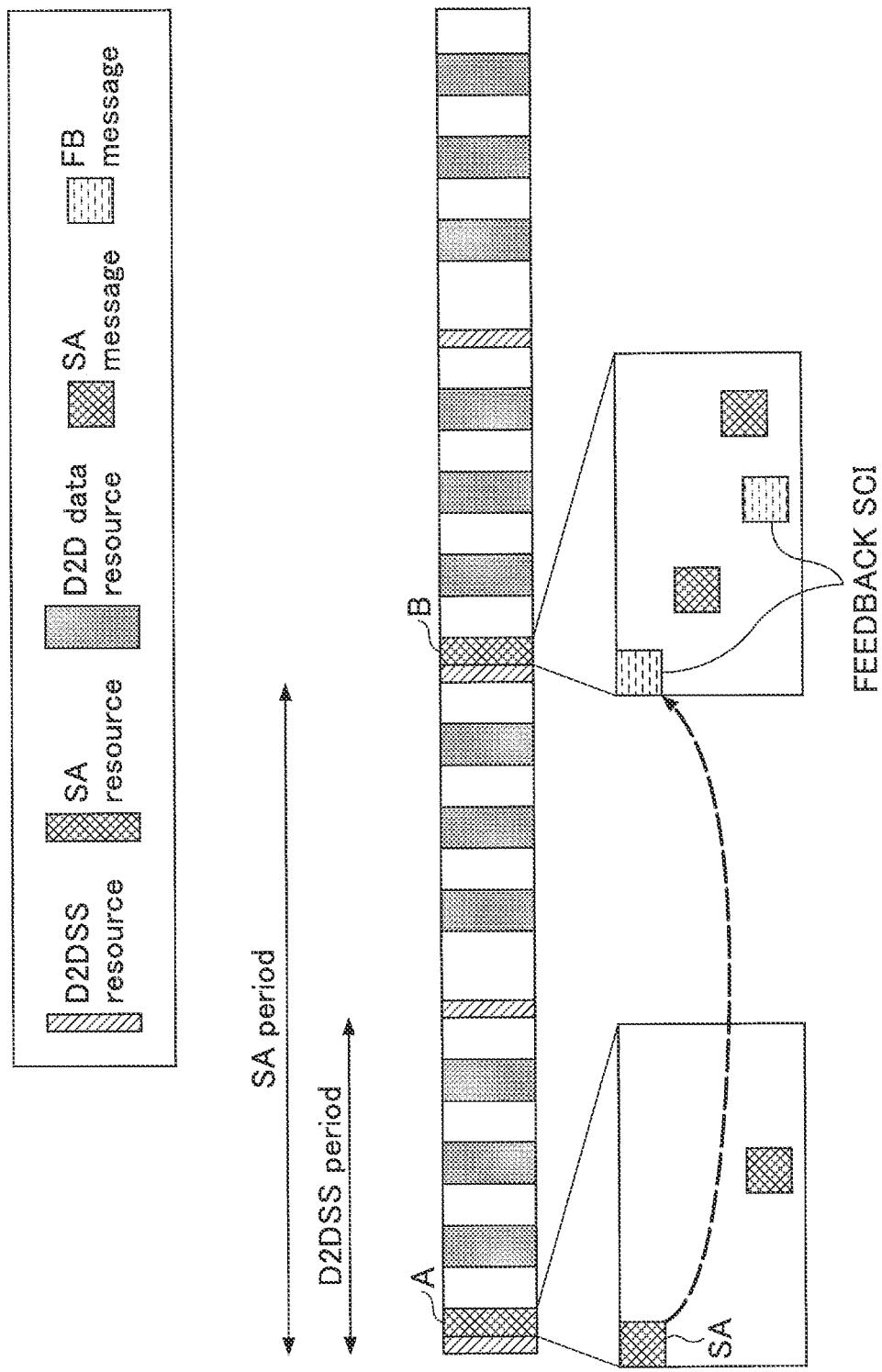
FIG. 4 is a diagram for illustrating feedback SCI.

FIG. 4 illustrates an example of mapping of the feedback SCI. As illustrated in FIG. 4, in this example, feedback SCI (a feedback message) for Data corresponding to SA transmitted from the transmitting UE in the SA resource pool indicated by A is transmitted from the receiving UE with a resource in the SA resource pool indicated by B.

In FIG. 4, as an example, it is indicated that, in the SA resource pool, the SA resource position and the feedback SCI resource position have a predetermined correspondence. Namely, in this example, the receiving UE can determine the resource for the feedback SCI based on the position of the resource with which the SA is received; and can transmit the feedback SCI by using the resource.

In the resource configuration example 2, control may be performed such that the transmitting UE that has transmitted the SA in a SA resource pool does not perform new scheduling for the next SA resource pool (does not transmit SA). The reason is that, in the D2D, there is the Half duplex restriction that the UE may not simultaneously perform transmission and reception (in the same subframe), so that, if SA transmission is performed in a certain subframe in the next SA resource pool, the feedback SCI, which may be received in the subframe, may not be successfully received.

Furthermore, the transmitting UE that has transmitted the SA in a certain SA resource pool may detect only the feedback SCI in the next SA resource pool. In this manner, for a case where reception of the feedback SCI is expected, by only performing detection of the feedback SCI, the number of times of SCI blind detection (the number of times of search) can be reduced, and the feedback SCI can be efficiently detected.

Furthermore, in order to avoid collision between feedback SCI and SA (scheduling SCI), in Mode 2 (the mode in which resource selection is autonomously performed), the receiving UE that detects the SA (the scheduling SCI) requesting feedback may exclude the feedback SCI transmission resource in the next SA cycle from transmission resource candidates for the SA (the scheduling SCI).

Here, if, in the UE, the SA (the scheduling SCI) collides with the transmission/reception subframe of the feedback SCI, one of them may be prioritized. For example, transmission and reception may be formed in the order of precedence represented by "feedback SCI reception>feedback SCI transmission>scheduling SCI transmission>scheduling SCI reception," in descending order of priority. For example, if, in a certain UE, feedback SCI reception and scheduling SCI transmission are in the same subframe, the feedback SCI reception is performed in the subframe. The above-described order is an order from the perspective that retransmission likely occurs between UEs in the near future; and it is an example. In this manner, by prioritizing the operation in which retransmission may occur, overheads and latency can be reduced.

<Resource Configuration Example 3 for Feedback>

In the resource configuration example 3 for feedback, a feedback signal is to be transmitted by using Data of the D2D at the receiving UE. Namely, ACK/NACK and CSI are transmitted as Data. In this manner, by using Data for feedback, many ACK/NACK bits can be fed back.

Figure 5:
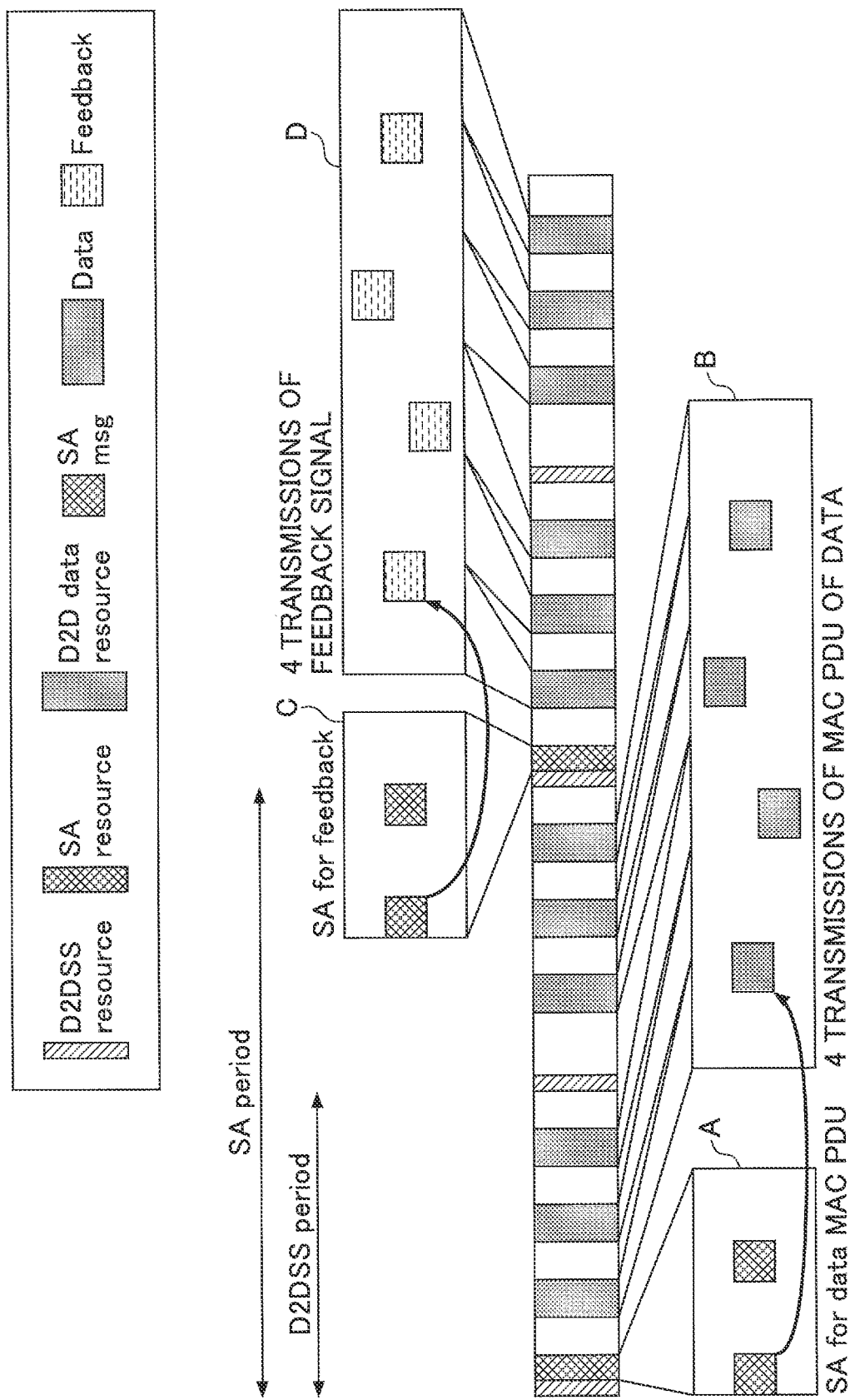
FIG. 5 is a diagram illustrating an example 1 of feedback by Data.
Figure 6:
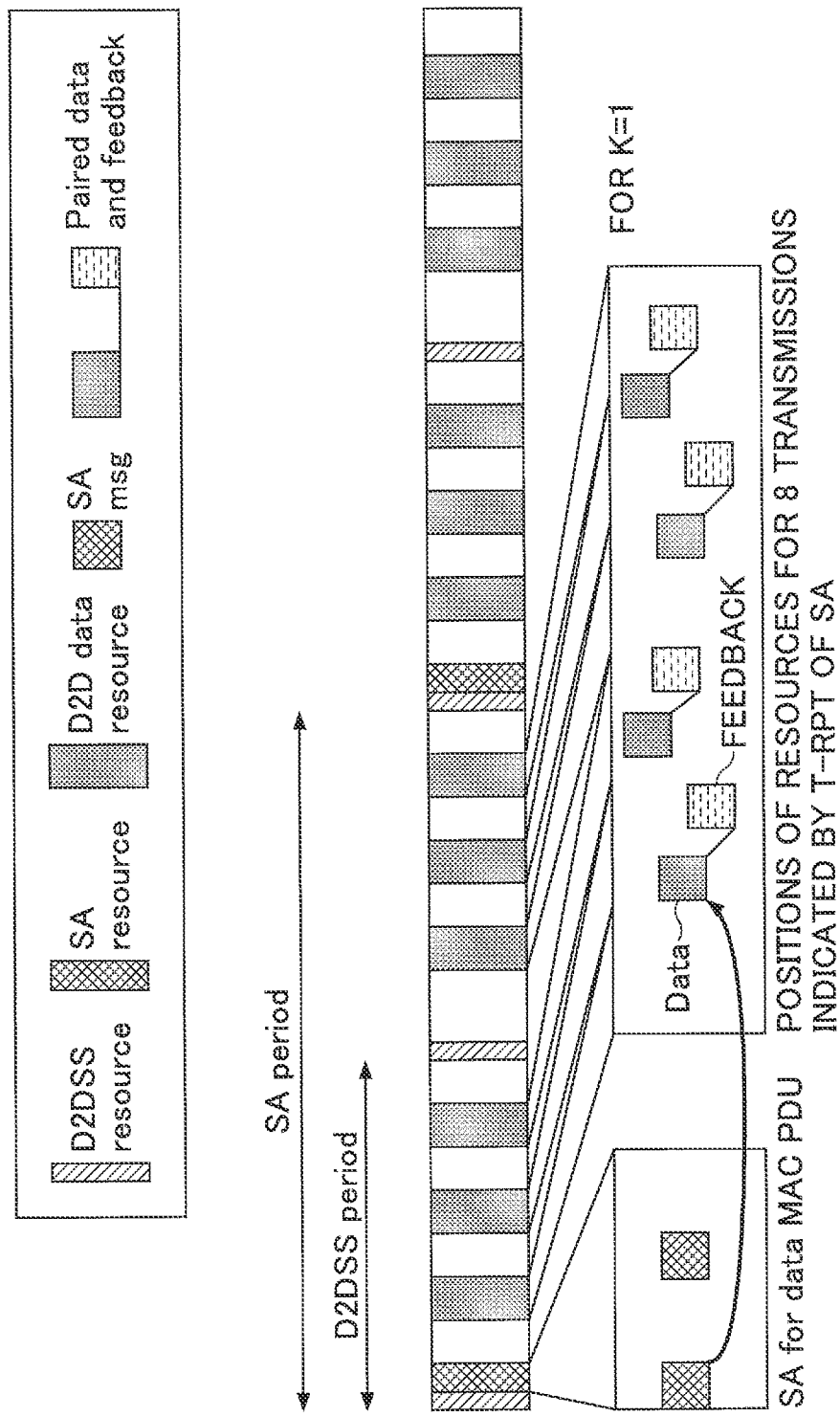
FIG. 6 is a diagram illustrating an example 2 of the feedback by Data.
Figure 7:
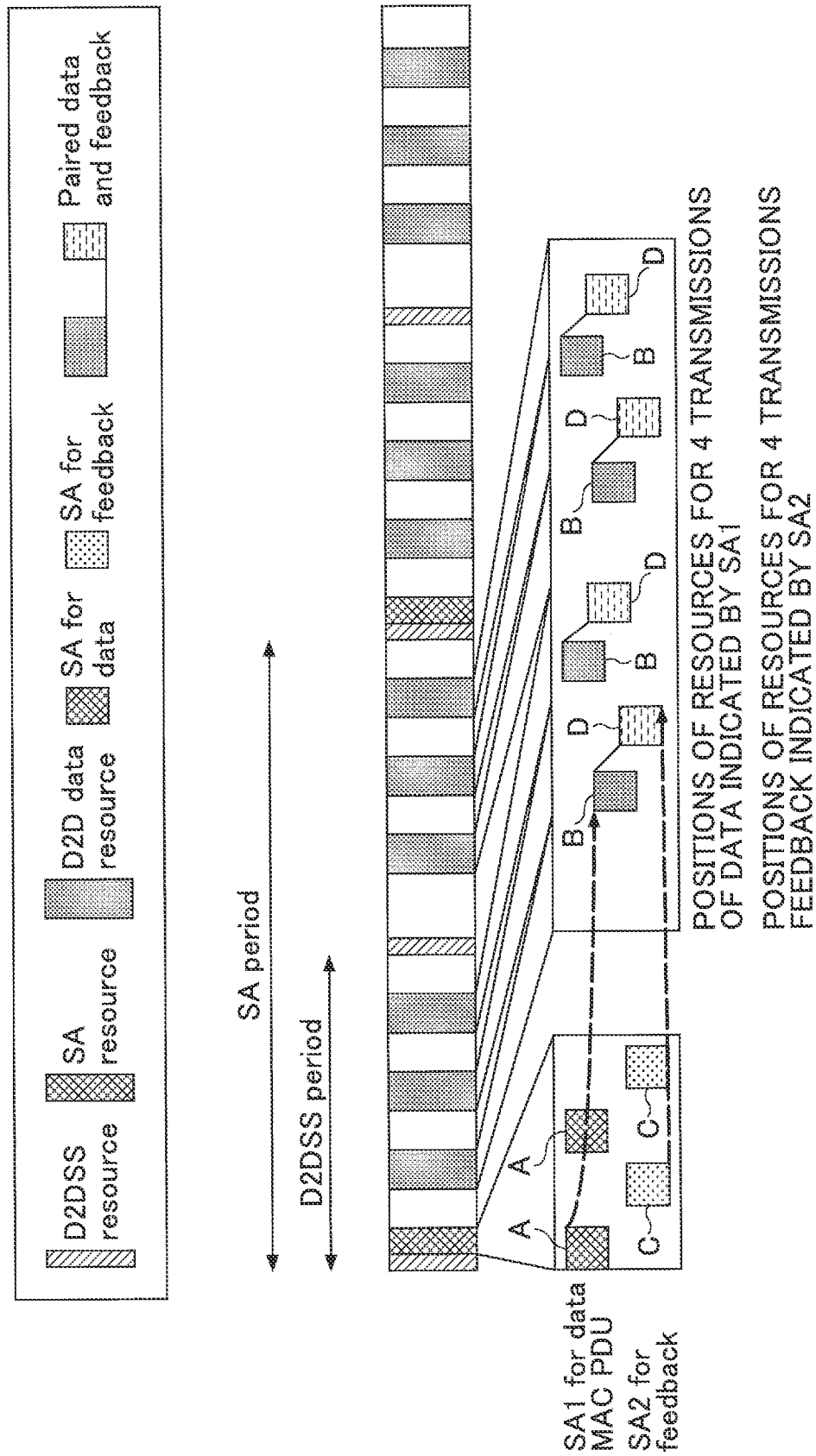
FIG. 7 is a diagram illustrating an example 3 of the feedback by Data.

More specific three examples (example 1 through example 3) are described by referring to FIG. 5 through FIG. 7.

In example 1 (FIG. 5), the receiving UE processes the feedback signal as normal Data. Namely, in FIG. 5, SA/Data is transmitted from the transmitting UE with the resources indicated by A and B. Then, the receiving UE transmits the SA for transmitting the feedback signal as Data (which includes the resource position of Data as the feedback signal) with the resource C; and transmits the feedback signal with the resource D. Note that, in FIG. 5 (the same applies to other figures), it is indicated that Repetition is performed twice for the SA, and Repetition is performed four times for Data.

In example 2 (FIG. 6), the receiving UE transmits a feedback signal for the received Data as Data (with the Data resource) to the transmitting UE within the same cycle as the SA/Data transmitted from the transmitting UE. In FIG. 6, it is indicated that the resource for the received Data is associated with the resource for the feedback signal with respect to the Data.

Namely, the correspondence (mapping) is defined in advance between the resource of Data indicated by SA transmitted from the transmitting UE and the resource to be used for feedback transmission. This may be configured in the UE by signaling from the base station eNB to the UE; or may be configured in advance in the UE. Furthermore, a plurality of correspondence relationships (mappings) may be defined, and one of them may be used. Based on the correspondence, the receiving UE can transmit the feedback signal as Data.

Note that information indicating the Data resource position for feedback may be included in T-RPT (which is included in the SA) specifying a pattern etc. of Repetition of Data; and the receiving UE may determine the Data resource for the feedback based on the information.

Furthermore, it may be configured such that one feedback resource is allocated to K (K is an integer greater than or equal to 1) times of Data transmissions (initial and Repetition), and K is configurable. The example of FIG. 6 is the example where K=1 (Data and the feedback is one-to-one). Furthermore, the frequency domain resource of the feedback signal may be the same as or different from the resource allocation by the SA from the transmitting UE.

In example 3 (FIG. 7), the transmitting UE reports, to the receiving UE, the Data resource position for the feedback transmission by using the SA. In the example of FIG. 7, the transmitting UE transmits the SA (SA2) for allocating the feedback resource in the same SA cycle as the SA (SA1) for Data transmission from the transmitting UE.

Namely, in FIG. 7, the receiving UE receives Data (indicated by B) with the resource specified in the SA1 (indicated by A) for Data; and transmits, to the transmitting UE, the feedback signal (indicated by D) with the resource specified in the SA2 (indicated by C) for the feedback.

For the SA (the scheduling SCI) specifying the resource for the feedback, a new field for specifying the resource for the feedback may be formed in the existing SA. Furthermore, the resources for transmitting the SA1 and the SA2 may be different subframes, or may be consecutive frequency positions within the same subframe.

Furthermore, the resources of the Data/feedback signals specified the SA1/SA2 may be associated, or may be independent from each other.

<Details of the Above-Described Example 3>

In transmission of the normal SA, the SA is transmitted by the Data transmission side; however, in the above-described example 3, even if the transmitting UE transmits the SA (SA2), Data corresponding to the SA is not to be transmitted; and Data (feedback) corresponding to the SA (SA2) is transmitted by the side receiving the SA (SA2). In the normal operation, the transmitting UE reports, to the receiving UE, transmission timing (TA) of Data by the SA; however, in the operation of the above-described example 3, the transmission timing is not reported. Namely, the receiving UE may not report, to the transmitting UE, the transmission timing of Data to be transmitted as feedback.

In view of the above-described point, in the embodiment, the receiving UE uses the transmission timing (TA) reported by the SA (SA2 in FIG. 7), which is transmitted from the transmitting UE, as the transmission timing of Data to be transmitting as the feedback signal.

By using such a method, timing uncertainty at the time of receiving the feedback signal can be minimized for the transmitting UE. Furthermore, the transmitting UE may report, to the receiving UE by the TA, whether it knows the transmission timing for the receiving UE, which transmits the feedback.

Furthermore, the receiving UE may transmit Data (feedback signal) based on the timing information of the receiving UE itself without using the TA bits reported from the transmitting UE.

The timing information here is, for example, own UL transmission timing, DL reception timing, etc. Depending on the state of the RRC, for example, in the RRC CONNECTED mode, the UL timing may be used; and in the IDLE mode, the DL timing may be used. In this manner, by transmitting Data (feedback signal) without using TA, the overhead for the TA reporting can be reduced. Furthermore, the corresponding bits can be used for reporting any other feedback related information.

Here, in the normal SA transmission, it can be considered to include the ID of the Data receiving side, as an ID. In this case, for the case of SA2 of example 3, since Data (feedback signal) is received by the transmitting UE that transmits the SA (SA2), it can be considered to include, as the L1 ID, the transmitting UE's ID in the SA2. In this case, it can be considered that, in the receiving UE that expects the SA including the own ID, the SA2 may not be detected.

In view of these points, for SA for a special purpose, such as the SA2 of the example 3, a format that is different from that of normal SA may be used or information (Contents) indicating that it is for a special purpose may be included; and, in response to detecting the format of the special SA or the Contents, the receiving UE may receive the SA (SA2) regardless of the L1 ID, and may determine whether Data (feedback signal) transmission is required. Alternatively, as the L1 ID, a Unicast ID may be used, which is to be detected by the receiving UE.

Note that the above-described resource configuration examples 1, 2, and 3 may be properly switched to be applied. As a method of switching, the base station eNB may instruct the UE, through higher layer signaling, which method is to be used; or the UE may autonomously switch the method depending on the coverage state, such as within coverage/outside coverage, or a mode of the D2D (Mode 1, Mode 2). By configuring the system to be able to be switched as described above, efficiency of the feedback can be optimized depending on the degree of freedom and certainty of resource allocation.

<Example of Feedback Resource Allocation>

An example of a method of allocating a feedback resource according to the embodiment is described by referring to FIGS. 8A and 8B, which can be applied to the above-described resource configuration example 1, the resource configuration example 2, the example 1 and example 2 of the resource configuration example 3, and so forth.

In this example, correspondence is defined between the resource for transmitting the SA (receiving, if it is viewed from the receiving UE) and the resource for transmitting the feedback signal (which includes the SA for the Data for transmitting the feedback information), and the feedback transmission resource is implicitly reported to the receiving UE by the SA transmission resource from the transmitting UE. Namely, the receiving UE can determine the feedback transmission resource based on the reception resource of the SA received from the transmitting side; and can use it for transmitting the feedback signal.

For example, as illustrated in FIG. 8A, a resource may be determined, so that the feedback signal corresponding to the SA transmitted in a certain subframe is to be transmitted in a subframe having the same number as the certain subframe. Furthermore, for example, when SA-A, SA-B, and SA-C are transmitted from one or more UEs to the receiving UE in a subframe X, the receiving UE may transmit, in a subframe Y, feedback signals respectively corresponding to these SAs. Namely, feedback transmission may be performed in the same subframe for SA transmissions in the same subframe. In this manner, by restricting, for the transmitting UE, the subframe in which the feedback signals are to be received, the effect of the Half duplex can be avoided.

Furthermore, the transmitting UE may include, in the SA, a parameter used for determining the transmission resource of the SA (example: the parameter S as the SA resource index) to be transmitted to the receiving UE; and the receiving UE may determine a resource for transmitting the feedback signal by using the parameter.

Furthermore, a plurality of feedback transmission resource candidates may be defined for each SA transmission resource; and the receiving UE may switch a resource to be actually used, depending on the Contents (e.g., ARI: ACK/NACK resource indicator) included in the SA. In the example of FIG. 8B, a case is illustrated where CDM (code division multiplexing) is to be performed. In the example of FIG. 8B, two feedback transmission resource candidates are defined for each SA transmission resource; and the receiving UE selects one resource to perform transmission of the feedback signal, depending on the Contents of the SA.

By adopting the above-described method, the effect of the Half duplex can be avoided. Furthermore, Data and feedback can be dynamically associated; and reduction of the overheads of the feedback resources and randomization of collisions among the feedback resources can be achieved.

Note that the above-described feedback transmission resource candidate may be determined based on the transmission resource of the SA; or may be determined by the higher layer signaling from the base station eNB. Furthermore, information on the correspondence between the resource of the SA and the resource of the feedback signal may be preset in each UE; may be reported from the base station eNB to each UE by the higher layer signaling; or may be shared by signaling between UEs.

Furthermore, the receiving UE may determine the resource size for transmitting the feedback signal depending on the number of the transmission subframes of Data transmitted from the transmitting UE.

For example, the receiving UE can determined the resource size of the feedback signal based on the number of Data subframes of the D2D that can be used during the Data scheduling period (e.g., from the end of the SA resource pool to the start of the subsequent SA resource pool). Furthermore, the receiving UE may determine the resource size of the feedback signal based on the number of the subframes used for actual Data transmission, which is reported by T-PRT, etc. included in the SA. As a specific determination method, for example, a function may be defined such that the resource size of the feedback signal becomes greater, as the above-described number of the subframes of Data increases; and the resource size of the feedback signal may be determined by using the function. By determining the resource size of the feedback signal in this manner, an appropriate feedback amount can be selected depending on the amount of the transmission data.

Furthermore, in order to reduce the retransmission latency, a SA cycle and the number of SA resource pool subframes smaller than those of Rel-12 may be configured. In this manner, for example, it is considered that there is a case where a subframe capable of Data transmission starts prior to the last subframe of the SA resource pool; however, in this case, the scheduling by the SA in the SA resource pool may schedule Data in the subsequent SA cycle.

<Feedback Signal Configuration>

As described in the "resource configuration example 1 for feedback," when a feedback channel (a resource) is to be newly defined, a configuration may be adopted which is based on the PUSCH similar to the SA, or a PUCCH format may be used, as the signal configuration in the channel.

Figure 10:
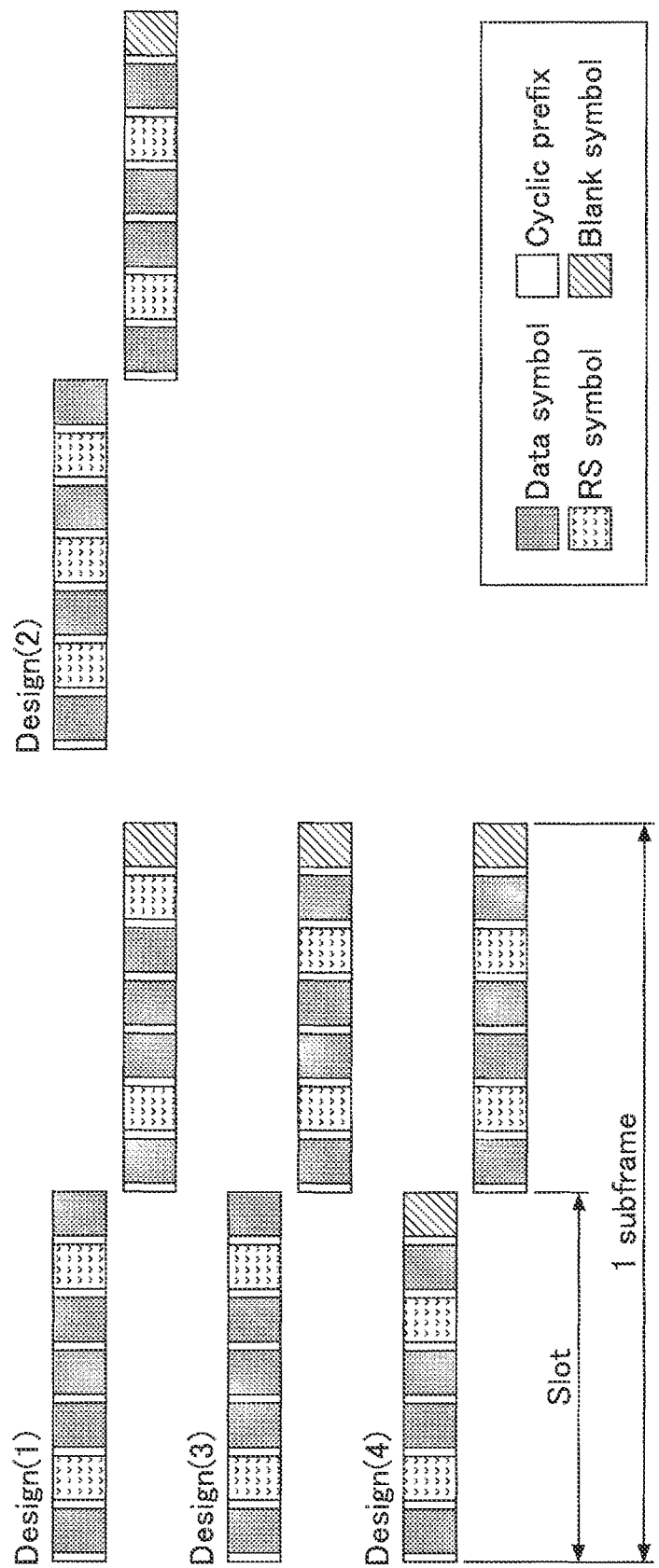
FIG. 10 is a diagram illustrating an example of a symbol mapping configuration based on PUCCH format 3.

FIG. 9 shows examples (design examples 1 through 3) of the signal configuration based on the PUCCH format 1; and FIG. 10 shows examples (design examples 1 through 4) of the signal configuration based on the PUCCH format 3. Note that the signal configurations shown in FIG. 9 and FIG. 10 are examples, and it is not limited to these. In FIG. 9 and FIG. 10, feedback information is mapped onto the Data symbol.

In the PUCCH format of the D2D, the last symbol of one subframe is punctured (no transmission). In the design examples 1 and 2 of FIG. 9, and in the design examples 1, 2, and 3 of FIG. 10, considering the last symbol of the subframe to be punctured, different symbol mappings are used between the slots. In this manner, if different configurations are adopted between the slots, it is possible to maximize the use of the symbols of the first slot.

Furthermore, in the design example 3 of the FIG. 9 and the design example 10 of FIG. 10, the same symbol mappings are used between the slots by additionally puncturing the last symbol of the first slot. In this manner, if common configurations are adopted between the slots, reception complexity (Complexity) can be reduced.

Note that, in the examples of FIG. 9 and FIG. 10, frequency hopping is performed between slots; however, the two slots (one subframe) may be transmitted with the same frequency resource without performing frequency hopping between the slots.

In the present embodiment, multiple feedback signals can be code division multiplexed (CDM) in the same time and frequency resource, and thereby the time and frequency resource can be effectively utilized. Accordingly, in the embodiment, DM-RSs, which are indicated as "RS symbol" in FIG. 9 and FIG. 10, may be made orthogonal.

FIG. 11 shows a configuration example of the DM-RS in a PUCCH-based feedback signal. The Group hopping, the sequence hopping, and the delta shift, which are shown in the frame A of FIG. 11 and used for generating a DM-RS base sequence (DM-RS base sequence), may be fixed; or may be the same as those of Data.

Furthermore, for example, by using a fixed value or a value that is common among feedback signals multiplexed in the same resource in the Cell ID field used for sequence generation, orthogonal multiplexing of the DM-RSs by CS/OCC (Cyclic shift/Orthogonal Cover Code) (B in FIG. 11) can be achieved.

Furthermore, when the feedback signals are code division multiplexed, DM-RS orthogonalization among the feedback signals multiplexed in the same time/frequency resource, which correspond to different SCIs, can be achieved by the CS/OCC.

Note that, as in the first example shown in B of FIG. 11, if the CS/OCC is determined based on the L1 ID, collision may occur among the feedback signals; however, if the CS/OCC is determined based on the ID/index related to HARQ, and/or the SCI resource index, the collision can be completely avoided. Here, the SCI in the SCI resource index is the SCI for resource allocation of Data, which is transmitted from the transmitting UE, and which is the target of the feedback.

<Feedback Content>

In the embodiment, as the contents of the feedback signal transmitted from the receiving UE to the transmitting UE, there are the ACK/NACK and the CSI. Note that these are examples, and any other information may be transmitted as the feedback signal. An example of a specific transmission method of the ACK/NACK and the CSI is described below. Furthermore, the examples described below can be applied to all the feedback transmission methods (e.g., the resource configuration examples 1, 2, and 3), except as indicated otherwise.

<Feedback Content Example 1: ACK/NACK>

First, the ACK/NACK is described. In the embodiment, the receiving UE determines ACK/NACK for each MAC PDU received from the transmitting UE; and reports the ACK/NACK to the transmitting UE, as the feedback signal. However, as described later, the receiving UE may group the ACK/NACK to bundle it (Bundling), so that the ACK/NACK may be fed back with fewer resources.

Furthermore, in the feedback signal to be reported from the receiving UE to the transmitting UE, the number of the MAC PDUs to be fed back, and/or the number of the ACKs/NACKs may be included to be reported. As a result, the transmitting UE (the UE receiving the feedback) can recognize the number of the MAC PDUs, and/or the number of the ACKs/NACKs to be received as the feedback, so that errors in receiving the feedback can be avoided. Additionally, a confirmation bit stream may be included in the feedback signal to be reported from the receiving UE to the transmitting UE. The confirmation bit stream is a stream to be transmitted as the feedback that can be associated with (a sequence of) MAC PDUs; and it can be generated from the T-RPT etc. in the SA, for example. Errors in receiving the feedback can also be avoided by this method.

<Feedback Content Example 2: CSI>

The receiving UE can transmit the CSI as the feedback signal. The contents of the CSI include, for example, CQI (Channel Quality Indicator indicating reception quality of received data), RI (rank index), and so forth. For example, the receiving UE calculates the CSI by using the received DM-RS (or a new RS).

Note that, in the D2D, transmission power and the number of times of Repetitions can be changed, so that Link adaptation can be performed with a dynamic range that is wider than the dynamic range of the CQI according to related art. Thus, a new CQI that can take more numerical values may be defined for the D2D.

In this manner, feedback of reception quality (SINR) can be performed in a wider range than that of the existing COI; however, it can be considered that the overheads for the CSI feedback are increased.

Thus, the receiving UE in the embodiment can report, as the CSI feedback, relative (rough) reception quality information with respect to Data transmitted from the transmitting UE.

The rough reception quality is, for example, the margin of the received SINR (the difference from the required SINR), the number of times of combined reception with which the Data can be received, and so forth; however, it is not limited to these, and it can be any other information as long as it is reception quality information with a reduced information amount. Furthermore, as an example of transmitting rough reception quality, reception quality may be implicitly reported by a transmission power control command.

Furthermore, as an example of transmitting the rough reception quality, ACK/NACK may be reported for each Data Repetition transmission (including the initial transmission). The receiving side of the ACK/NACK (the transmitting UE) can roughly estimate the reception quality by the ratio of the ACKs/NACKS among a plurality of Data transmissions.

As described above, by transmitting the CSI with the feedback signal, Link adaptation with a high convergence property can be achieved compared to Link adaptation based only on the ACK/NACK, while keeping the low probability of occurrence of block errors. Furthermore, a dynamic range that is wider than that of the existing COI report can be supported.

Here, the receiving UE may use the above-described relative (rough) CSI only for reporting it together with ACK/NACK; and may report the absolute CSI in another format when the transmitting UE requests the CSI. In this manner, by allowing to report the absolute CSI, convergence of Link adaptation can be expedited.

<With Regard to Bundling (Bundling)>

As described above, the receiving UE can bundle the ACKs/NACKs for respective MAC PDUs of Data received from the transmitting UE to report it to the transmitting UE. There are various methods for bundling itself; however, for example, there is a bundling method such that only NACKs are transmitted without transmitting ACKs.

The receiving UE may always apply bundling, or may apply bundling if the number of the Data transmission subframes reported through the SA from the transmitting UE is greater than or equal to a predetermined value. The predetermined value is a value such that, when the number of the Data transmission subframes exceeds the predetermined value, the amount of the feedback resources exceeds the amount of the resources that can be used for transmitting the feedback signals.

Figure 12A:
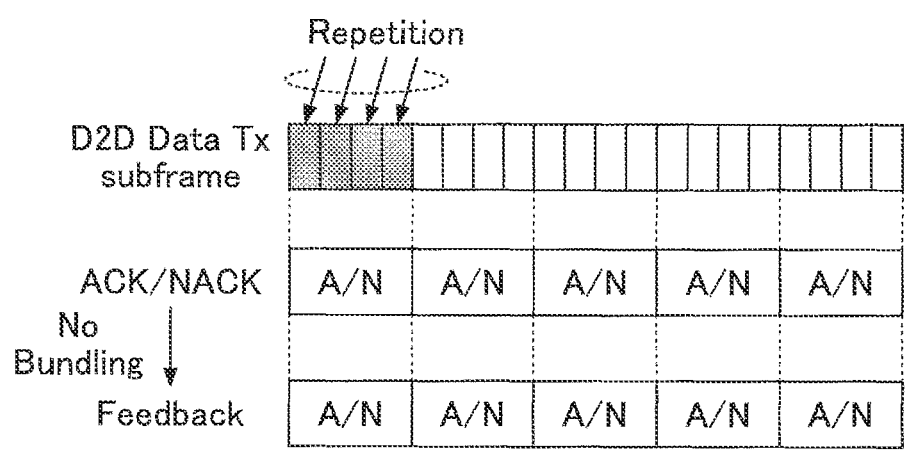
FIG. 12A is a diagram illustrating bundling of ACK/NACK feedback.
Figure 12B:
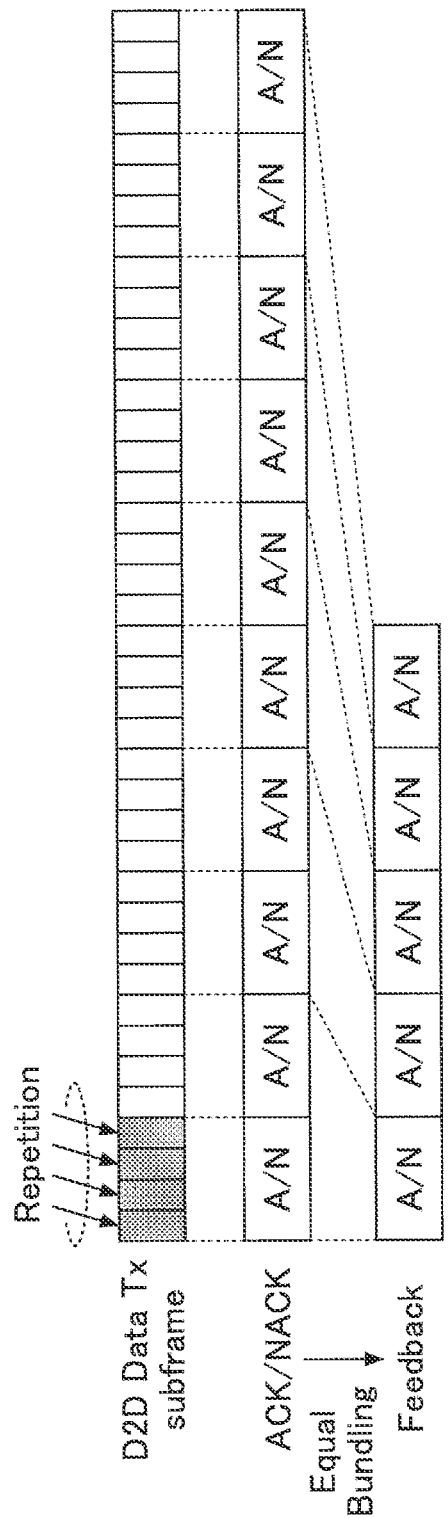
FIG. 12B is a diagram illustrating the bundling of the ACK/NACK feedback.

An example of the bundling is illustrated by referring to FIGS. 12A through 12C. FIG. 12A shows, as a reference, a case where bundling is not performed. FIG. 12B is an example where consecutive several (FIG. 12B shows a case of two) ACKs/NACKs are bundled, so that the ACK/NACK sequence is (almost) uniformly bundled. FIG. 12C is an example of applying bundling to the tail of the ACK/NACK sequence.

By applying bundling in this manner, the overheads of the ACK/NACK feedback can be reduced. Since the D2D Data is assumed to operate at a low BLER, deterioration of the throughput by bundling is considered to be limited.

<Example of ACK/NACK, CSI Mapping>

Next, an example of mapping of feedback information according to the embodiment is described. Mapping of the feedback information may be made by a signal point constellation; may be code division multiplexed (CDM) and reported as a sequence; or may be performed by defining a plurality of feedback resources (channels) and reported by channel selection.

A time and frequency resource may be the resource to be a target of the above-described channel selection; or a Cyclic shift and an OCC sequence may be used separated from the time and frequency resource, or in addition to the time and frequency resource.

For example, channel 1 (a resource defined as the channel 1) transmission may be associated with the NACK transmission; channel 2 (a resource defined as the channel 2) transmission may be associated with the ACK transmission; and reception quality information (e.g., rough CSI) may be transmitted on each channel.

FIG. 13 illustrates the example of this case. FIG. 13 illustrates the example where the SIR margin is transmitted as the reception quality information. Furthermore, for each of the ACK and NACK, asymmetric mapping of the quality information is made. Here, one ACK/NACK and one reception quality are multiplexed; however, when multiple ACKs/NACKs are to be fed back, the averaged reception quality information may be multiplexed with the ACKs/NACKs. Alternatively, only the ACK/NACK may be transmitted without combining the ACK/NACK and the reception quality information.

As described above, by transmitting the ACK/NACK by the channel selection (resource selection), for example, in Group-cast, even if ACKs/NACKs from multiple receiving UEs are multiplexed, the transmitting UE (the UE receiving the feedback) can detect the ACK/NACK of each UE by determining the power.

Furthermore, since, for the UE transmitting the NACK, the SINR is low and the channel estimation accuracy is unfavorable, by making the asymmetric mapping of the quality information as shown in FIG. 13, reporting of the rough quality information during transmission of the NACK can be more reliably executed.

<With Regard to the Feedback Using the SCI>

Here, in particular, a detailed example is described for a case where the feedback SCI is used, as described in the resource configuration example 2.

When the receiving UE performs feedback signal transmission by using the feedback SCI, the feedback signal transmission may be formed by defining a new SCI payload length that is different from that of the existing SA. As a result, a payload length that is different from that of the usual SCI (SA) can be supported, and efficient feedback can be performed.

Furthermore, when the receiving UE performs feedback signal transmission by using the feedback SCI, the feedback may be formed with the payload length that is the same as that of the existing SA. In this case, the receiving UE (the UE transmitting the feedback) differentiates the feedback SCI from the existing SCI (SA) by a part of bits in the SCI. As an example, in the feedback SCI, a part of bits is set to a predetermined setting value (e.g., a setting value that is not used in the usual D2D). The transmitting UE (the UE receiving the feedback) can identify the feedback SCI by the value of the bit.

For example, since 64 QAM is not used in the D2D, when the 64 QAM is reported as the MCS in the SCI, it is regarded as the feedback SCI. Alternatively, the CRC may be masked with a predetermined bit stream for the feedback SCI, and if the mask can be removed by the predetermined bit stream at the transmitting UE (the side of receiving the feedback), a determination may be made that it is the feedback SCI. Alternatively, the feedback SCI may be identified by the RS signal (e.g., DMRS cyclic shift). In this manner, by using the feedback SCI having the payload length that is the same as that of the existing SCI, it is possible to identify whether the SCI is for feedback without increasing the number of times of blind detection.

<With Regard to the Scheduling SCI>

Figure 14:
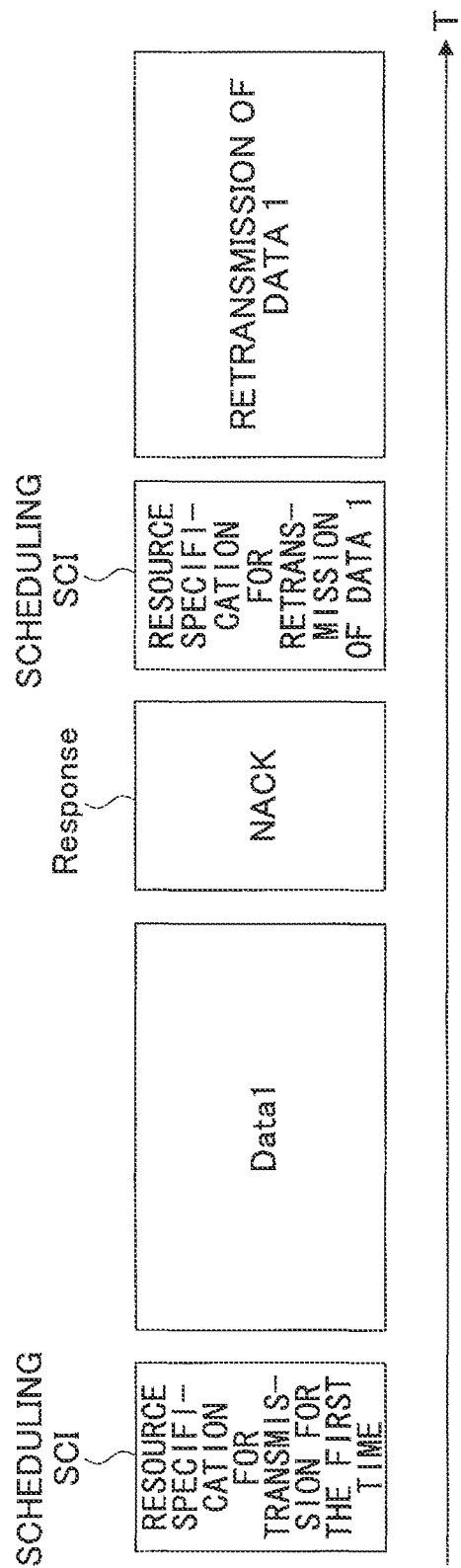
FIG. 14 is a diagram illustrating an example of scheduling SCI.

Here, a detailed example of the scheduling SCI corresponding to the SA is described. As exemplified in FIG. 14, in the scheduling SCI that supports retransmission etc. caused by the feedback, it is desirable to associate the resource to be retransmitted with Data to be retransmitted. In the following, a detailed example including a mechanism for doing this is described.

In the embodiment, as an example, a new SCI format is defined that is different from the format of the existing SA; and all the Contents information items described in the quotation marks below, or a combination of any two or more of these information items is allowed to be reported from the transmitting UE to the receiving UE. Additionally, information that is not shown below may be transmitted.

Contents: "existing SCI contents+a retransmission index/identifier, a NDI, the number of times of Data Repetitions, a CSI request, a feedback transmission resource indicator, the number of transmission MAC PDUs, and a TPC command"

The existing SCI contents are a TA, a L1 ID, a MCS, a frequency resource, a time resource (T-RPT index), and so forth.

The retransmission index/identifier is information indicating that the retransmission is for which Data, when the Data to be transmitted is the retransmission Data. With this information, the receiving UE can identify the target of retransmission.

The NDI (New Data Indicator) is information indicating that Data is for new transmission; and, with this, retransmission in the SA cycle can be supported. The number of times of Data repetitions indicates the number of times of Repetitions of the Data; and, by adjusting this number, a balance can be obtained between the effective throughput and the reception quality.

The CSI request is information instructing CSI transmission to the receiving UE; and, with this, the transmitting UE can obtain the CSI information in an aperiodic manner. Furthermore, the CSI request may be a request for transmitting a signal to be used for the CSI measurement.

The feedback transmission resource indicator (e.g., ARI: ACK/NACK resource indicator) is information for allocating (specifying) a feedback transmission resource to the receiving UE; and, with this, collision among the feedback transmission resources can be avoided.

Note that, for the feedback resource allocation from the transmitting UE to the receiving UE, Clustered PUSCH transmission or full bandwidth transmission may be reported, as an example.

The number of transmission MAC PDUs is the number of the MAC PDUs to be used for Data transmission by the transmitting UE; and, with this, when the number of the MAC PDUs that can transmit Data is greater than the number of the transmission MAC PDUs, the receiving UE can avoid unnecessary reception attempts. Additionally, with this, the receiving UE can differentiate a subframe that is not transmitted due to absence of the transmission Data from a subframe in which Data reception error occurs. Furthermore, mixed scheduling of retransmission and new transmission can be achieved, which is described below. For a case where the number of the transmission MAC PDUs is not reported by the scheduling SCI, the transmitting UE may transmit a signal with a special format in a subframe having no transmission Data. In this manner, the receiving UE can determine that there is no transmission Data.

The TPC command is a command for adjusting the transmission power of the receiving UE (the feedback transmitting side); and, with this, a balance can be obtained between the reception quality and an interfering level by adjusting the transmission power of the Unicast feedback.

As an example, transmission may be performed using 2PRB as a format of new scheduling SCI. This value is greater than that of the existing SCI (SA). As a result, even if the SCI payload length is increased, the quality can be ensured. Furthermore, for each SA resource pool that arrives periodically, the SCI format that can be transmitted may be limited. For example, it can be considered to transmit new scheduling SCI and the existing SA at different cycles, respectively. In this manner, the number of times of blind detection can be suppressed, and collisions among the SCI formats can be avoided.

Note that the scheduling SCI for Data retransmission may be defined separately from the scheduling SCI for new transmission; and the transmitting UE may perform the SCI transmission in accordance with the definition. In this case, the receiving UE that has transmitted the NACK can preferentially detect the scheduling SCI for retransmission within a range of the number of times of blind detection, so that it is effective for reducing the number of times of the blind detection, and for reducing the length of the SCI payload.

<With Regard to the Scheduling SCI: Detailed Example of the Retransmission Index>

Next, a detailed example of the above-described retransmission index is described. For example, the transmitting UE reports, as the retransmission index, an index of the scheduling SCI of Data to be retransmitted, or a resource index of the Data.

Furthermore, for example, the transmitting UE may report all of or a part of the parameters that are used for determining the transmission resource of the scheduling SCI for the Data to be retransmitted; or may report an identifier that has been reported to the receiving UE through the scheduling SCI. Alternatively, any of or all of the transmission resource index, the Data resource allocation information, and the T-RPT index of the above-described scheduling SCI may be reported. Additionally, an ID of the transmitting UE may be reported. By reporting the above-described information, when Data is received from multiple UEs, the receiving UE can identify the transmission sources to synthesize it.

Furthermore, the transmitting UE may report, as the retransmission index, the SA cycle of the Data to be retransmitted (at which point of time (the point of time in units of cycles), the Data is transmitted), so that retransmission in a range from a predetermined number of cycles (N) before to that point of time is allowed. Namely, the transmitting UE performs retransmission of an amount corresponding to up to N cycles; and the receiving UE also expects retransmission of the amount corresponding to up to N cycles.

Furthermore, retransmission may be performed using a resource based on the transmission resource index of the initial scheduling, without transmitting the retransmission index. For example, the retransmission may be performed by using a resource that is the same as that of the initial transmission; or a transmission resource may be determined by performing deterministic hopping among SA cycles. Namely, the hopping is defined, so that a resource of the retransmission Data can be determined from the resource of the initial transmission Data; and the transmitting UE and the receiving UE perform transmission and reception of the retransmission Data in accordance with the hopping rules. In this manner, by avoiding to use the retransmission index, signaling overheads can be reduced.

<With Regard to the Scheduling SCI: An Example of Selective Retransmission>

The transmitting UE may report, to the receiving UE, an index of, for example, the MAC PDU to be retransmitted, as the retransmission index; and may perform Data retransmission of selective subframes (or MAC PDUs). Specifically, for example, for Unicast, when NACK is received, the transmitting UE transmits the scheduling SCI including an index of the transmission MAC PDU corresponding to the NACK; and retransmits the Data corresponding to the transmission MAC PDU. Furthermore, for example, when NACK is received, the transmitting UE transmits the scheduling SCI including an index of the transmission subframe corresponding to the NACK; and retransmits the Data corresponding to the transmission subframe. In the receiving UE, it is possible to identify which part of Data is retransmitted by the index, so that Data can be assembled. With such a configuration, retransmission can be implemented with fewer subframes compared to the initial transmission.

Furthermore, in order to prevent feedback reception errors, the transmitting UE may report, to the receiving UE by the scheduling SCI, the number of the MAC PDUs for which NACKs (or ACKs) are reported, or a confirmation bit stream corresponding to the number of the MAC PDUs; and the receiving UE may transmit feedback corresponding to the number.

<With Regard to Scheduling SCI: Mixed Scheduling of Retransmission and New Transmission>

In the embodiment, the transmitting UE may perform, for the receiving UE, mixed scheduling of retransmission and new transmission.

Figure 15:
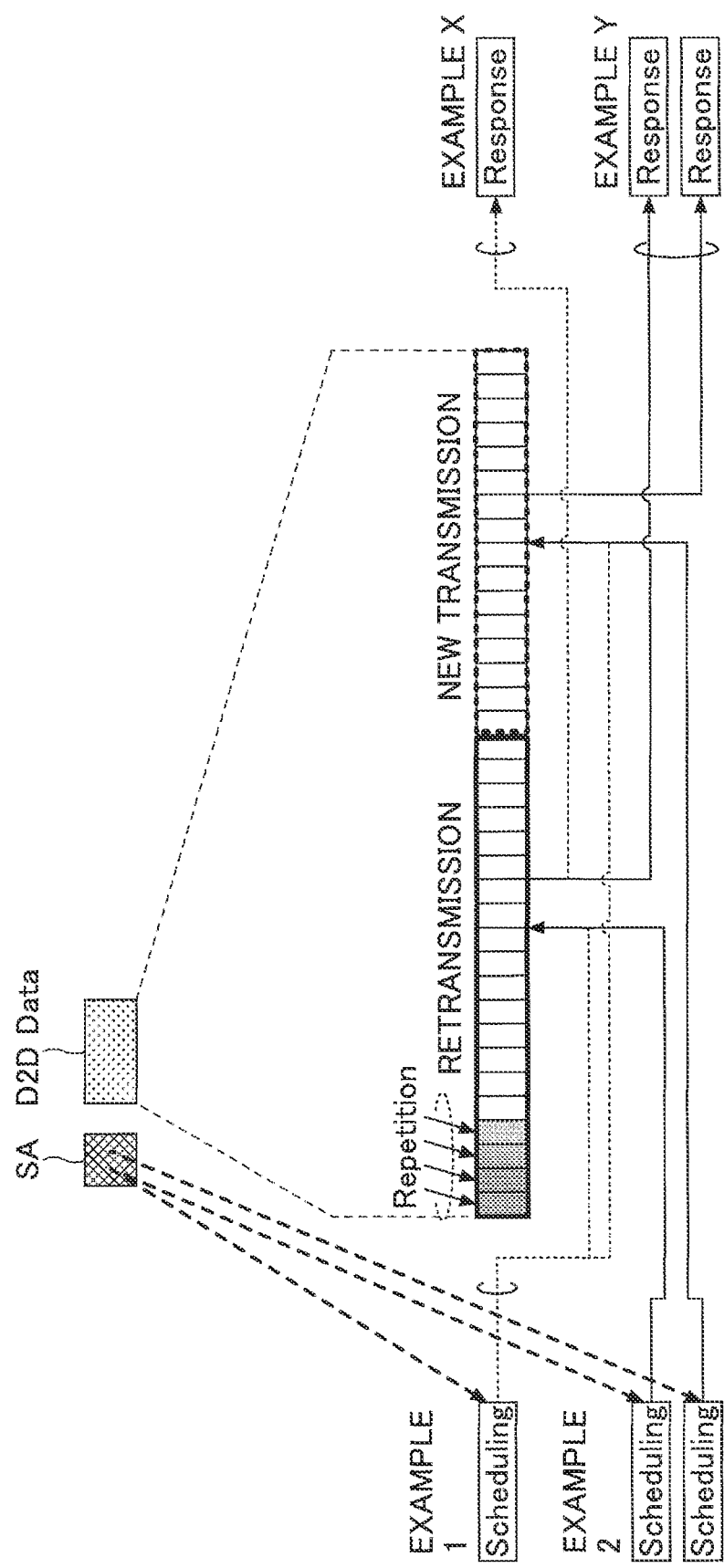
FIG. 15 is a diagram for illustrating a mixed scheduling of retransmission/new transmission.

For example, the transmitting UE performs mixed scheduling of retransmission and new transmission by reporting, to the receiving UE by the scheduling SCI, the number of the retransmission/new transmission MAC PDUs. As an example, when retransmission target Data and new transmission data exist, if the number of the MAC PDUs to be retransmitted is less than the number of the MAC PDUS that can be transmitted, the transmitting UE transmits, to the receiving UE by the scheduling SCI, scheduling information of the retransmission and the new transmission and the NDI for the new transmission; and time-multiplexes the retransmission MAC PDU and the new MAC PDU to transmit them. An example of this case is shown in FIG. 15 as example 1. In this case, after the retransmission, the new MAC PDU is to be transmitted.

Furthermore, as another example (example 2 in FIG. 15), the transmitting UE may perform mixed scheduling by transmitting the scheduling SCI for the retransmission and the scheduling SCI for the new transmission. More specifically, for example, "the TA, the L1 ID, the T-RPT index, and the frequency resource" are made the same and the NDI is made different between the scheduling SCI for the retransmission and the scheduling SCI for the new transmission, so that the new MAC PDU is transmitted after the retransmission MAC PDU.

Note that the feedback may be common feedback (example X of FIG. 15) regardless of the retransmission MAC PDU or the new MAC PDU; or feedback may be made independently for the retransmission and the new one (example Y of FIG. 15).

<Device Configuration of the First Embodiment: User Equipment>

Figure 16:
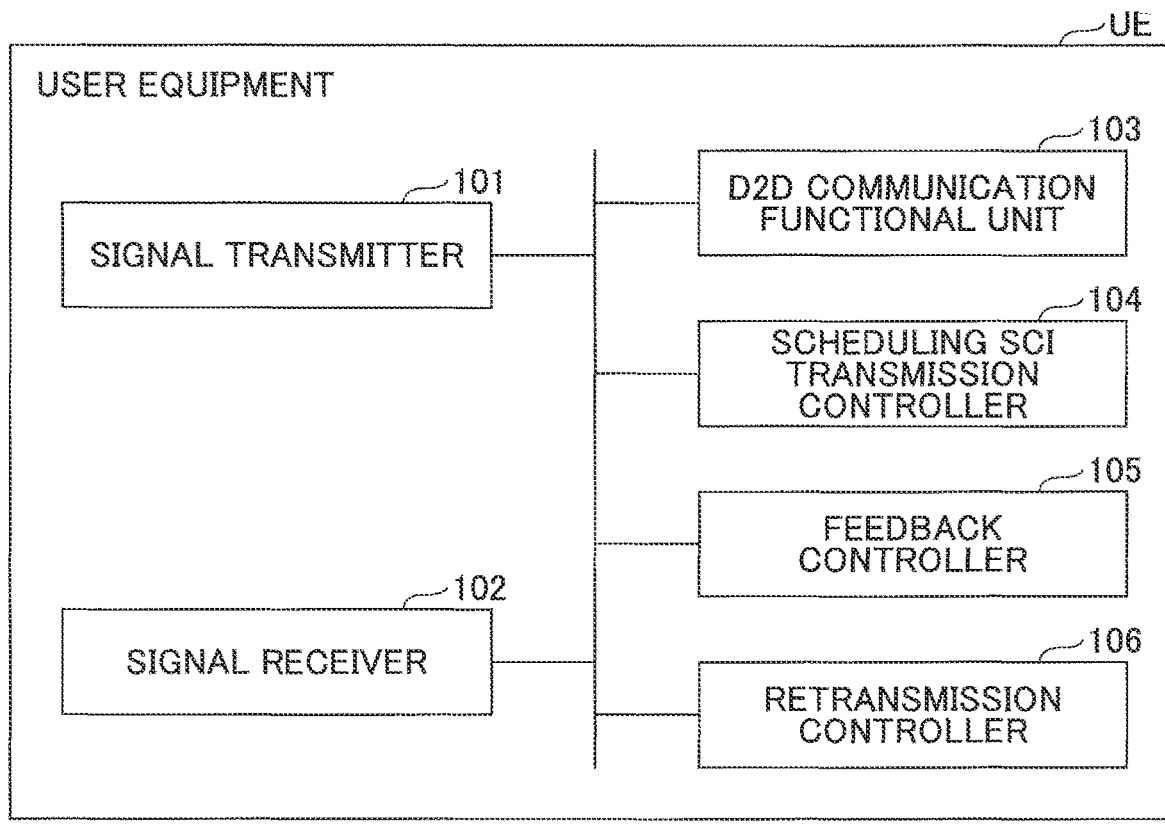
FIG. 16 is a configuration diagram of user equipment UE according to a first embodiment.

FIG. 16 shows a functional configuration diagram of the user equipment UE according to the embodiment. The UE shown in FIG. 16 is a UE that can be any one of the transmitting UE and the receiving UE described of the first embodiment. As illustrated in FIG. 16, the user equipment UE includes a signal transmitter 101; a signal receiver 102; a D2D communication functional unit 103; a scheduling SCI transmission controller 104; a feedback controller 105; and a retransmission controller 106. Note that FIG. 16 only illustrates, in the user equipment UE, the functional units particularly related to the embodiment of the present invention; and functions, which are not depicted, for performing at least operation conforming to LTE are also included. Additionally, the functional configuration illustrated in FIG. 16 is merely an example. The functional division and the names of the functional units may be any division and names, as long as the operation of the UE according to the embodiment can be executed.

The signal transmitter 101 includes a function for generating various types of physical layer signals from higher layer signals to be transmitted from the user equipment UE, and for wirelessly transmitting them. Additionally, the signal transmitter 101 has a transmission function of the D2D communication; and a transmission function of the cellular communication.

The signal receiver 102 includes a function for wirelessly receiving various types of signals from any other user equipment UE or the base station eNB, and for retrieving the higher layer signal from the received physical layer signals. The signal receiver 102 has a reception function of the D2D communication; and a reception function of the cellular communication.

The D2D communication functional unit 103 includes a D2D application function; and executes Discovery signal transmission and reception control, and SA/Data transmission and reception control. The scheduling SCI transmission controller 104 executes processing for transmission of the scheduling SCI (SA), which is described in the first embodiment. As an example, the scheduling SCI transmission controller 104 creates a signal of the scheduling SCI; and performs signal mapping, etc. of the scheduling SCI for the signal transmitter 101.

The feedback controller 105 executes processing (including transmission and reception of the scheduling SCI) for feedback transmission, which is described in the first embodiment. Additionally, the retransmission controller 106 executes processing for retransmission, which is described in the first embodiment.

Second Embodiment

Next, the second embodiment is described. As described above, the second embodiment relates to a technique of retransmission during Mode 1 resource allocation. Detailed subject matter is as follows. Note that the second embodiment is based on the first embodiment; however, the second embodiment can be separately implemented.

ACK/NACK is transmitted from the receiving UE to the transmitting UE; however, in Mode 1 resource allocation, D2D transmission resource allocation is performed by signaling from the base station eNB to the UE. Thus, even if the transmitting UE receives the NACK, the retransmission resource may not be immediately allocated from the base station eNB to the transmitting UE, so that it can be considered that retransmission latency occurs by waiting for the resource allocation.

Accordingly, in this embodiment, the above-described problem is solved by introducing the following processing procedure. As an example of the processing procedure, processing procedure examples 2-1 through 2-3 are described below.

<Processing Procedure Example 2-1>

Figure 17:
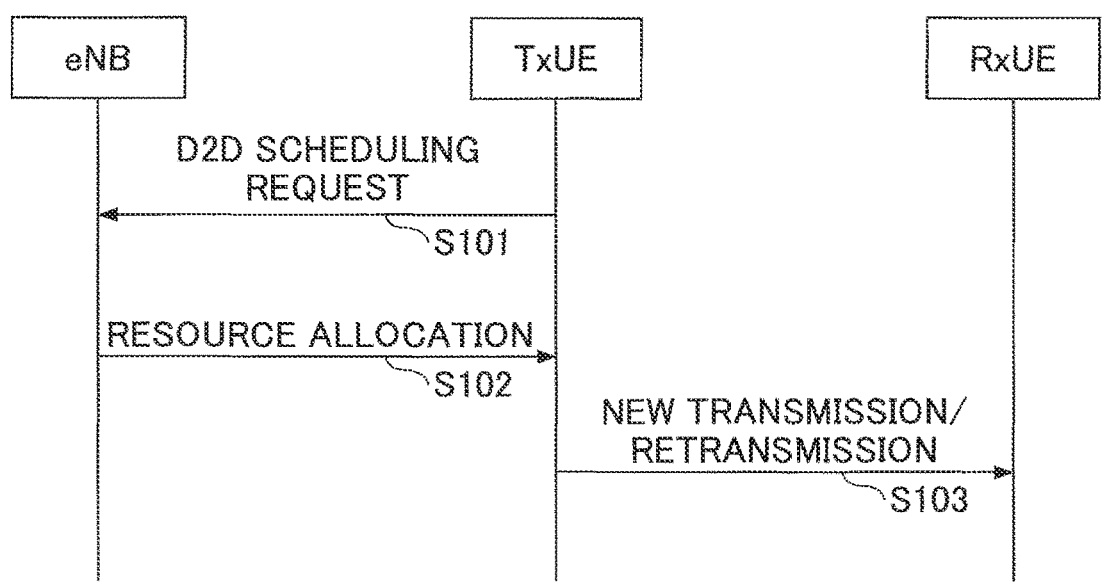
FIG. 17 is a diagram illustrating an example 2-1 of a processing procedure according to a second embodiment.

The processing procedure example 2-1 is described by referring to FIG. 17. At step 101, the transmitting UE makes a dynamic D2D scheduling request to the base station eNB. The D2D scheduling request may be a request for retransmission; or a request for new transmission. Here, for example, by making the scheduling request by L1 (e.g., PUCCH) signaling, dynamic transmission request can be implemented for the new transmission/retransmission. Additionally, a SA resource pool index that is to be the target of the request for allocation, an index of the Data to be retransmitted, and so forth may be included in the D2D scheduling request.

The base station eNB that receives the D2D scheduling request performs resource allocation (step 102). Then, the transmitting UE performs retransmission (or new transmission) by using the allocated resource (step S103).

In the processing procedure example 2-1, for example, by limiting the transmission of the scheduling request (step 101) only for the retransmission, the overheads can be reduced.

<Processing Procedure Example 2-2>

Figure 18:
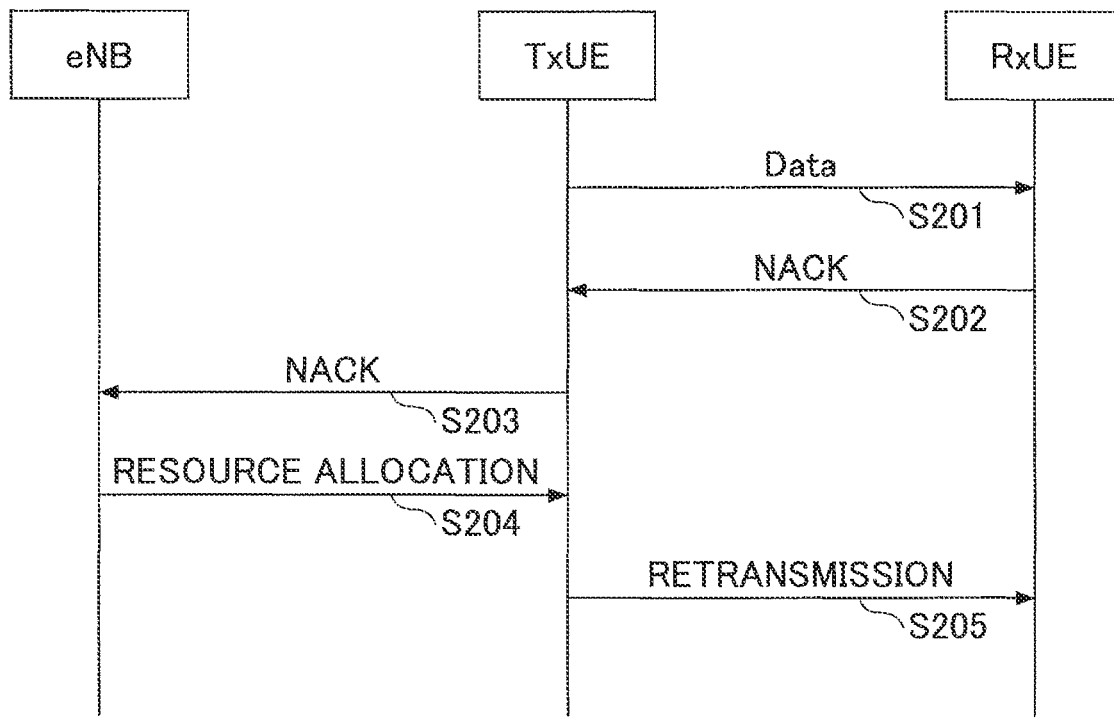
FIG. 18 is a diagram illustrating an example 2-2 of the processing procedure according to the second embodiment.

The processing procedure example 2-2 is described by referring to FIG. 18. Suppose that the transmitting UE transmits Data, and receives NACK from the receiving UE (steps 201, 202). The transmitting UE reports the NACK to the base station eNB (step 203). Note that, if ACK is received, the ACK may be reported. For example, by reporting NACK by L1 (e.g., PUCCH), dynamic transmission resource allocation can be implemented.

The base station eNB that receives NACK determines that resource allocation for retransmission is required, and performs, for the transmitting UE, resource allocation for retransmission (step 204); and the transmitting UE performs retransmission by using the resource (step 205).

<Processing Procedure Example 2-3>

Figure 19:
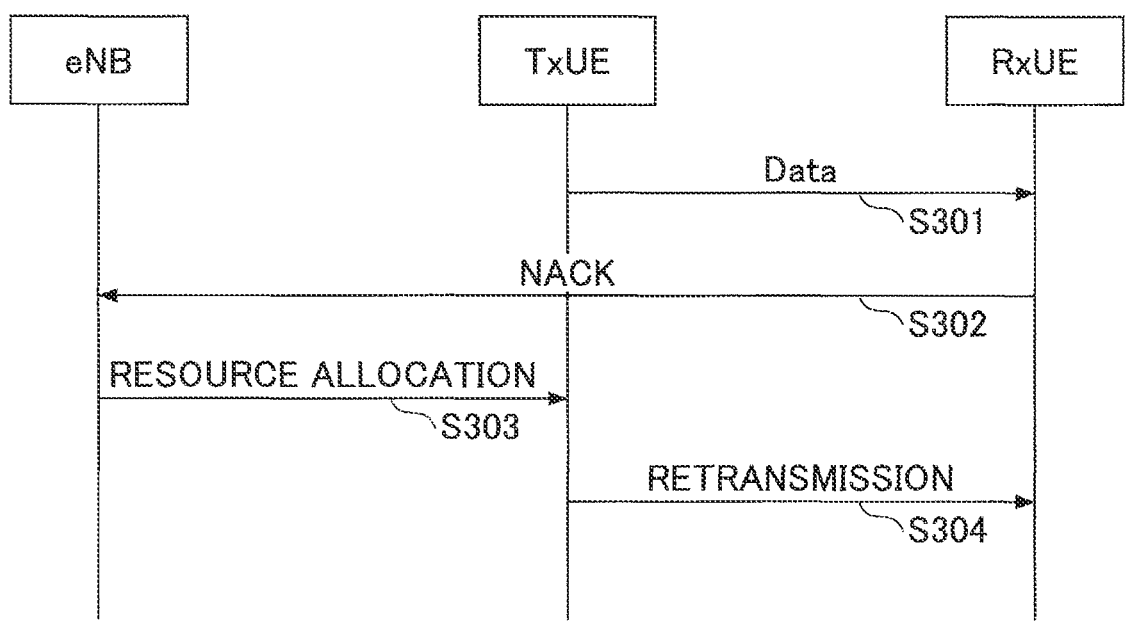
FIG. 19 is a diagram illustrating an example 2-3 of the processing procedure according to the second embodiment.

The processing procedure example 2-3 is described by referring to FIG. 19. In the processing procedure example 2-3, NACK transmitted from the receiving UE is received by the base station eNB (step 302). The transmitting UE does not receive the NACK, and does not transmit NACK to the base station eNB. The transmitting UE determines retransmission Data based on the resource allocation at step 303, and performs retransmission at step 304. Note that the transmitting UE may receive NACK at step 302, and may determine the retransmission Data based on the NACK.

In the processing procedure example 2-3, since the base station eNB determines the necessity of retransmission by receiving the feedback of the D2D, the feedback operation in Mode 1 may be limited to a case where both the transmitting and receiving UEs are RRC_CONNECTED or within the coverage. For other cases, the operation is based on Mode 2 resource allocation.

In the processing procedure example 2-3, by matching, for the UEs, the transmission timing of feedback, such as NACK, with UL timing (uplink transmission timing), reception of the feedback by the base station eNB can be facilitated. In order to ensure reception by the base station eNB, the transmission power may be adjusted to be the same as or a value obtained by applying an offset value to that of PUCCH or PUSCH.

Other Detailed Examples

In the second embodiment, when scheduling (resource allocation) is performed from the base station eNB to the UE by Mode 1 scheduling, Contents information described in the quotation marks below or a combination of any two or more of them may be reported by DCI.

Contents: "existing contents for Mode 1 scheduling+a retransmission index, a NDI, the number of times of Data Repetitions, a request for CSI report, and a feedback transmission resource indicator."

Among the above-described information items, the existing contents for Mode 1 scheduling are Hopping flag, Data RB allocation, T-RPT index, SA resource index, and so forth. The information items other than the existing contents for Mode 1 scheduling are as described above. The transmitting UE can perform retransmission by transmitting the scheduling SCI including these information items to the receiving UE.

In the second embodiment, the transmitting UE may report, to the base station eNB, the CSI received as a feedback signal from the receiving UE. The reporting may be performed by higher layer signaling, or L1 signaling. By finding the CSI from the receiving UE, the base station eNB can determine the resource amount to be allocated to the transmission buffer for the transmitting UE based on the CSI. For example, if the reception quality is favorable, a large resource amount can be allocated.

Furthermore, the transmitting UE may report the result of the Link adaptation with the receiving UE to the base station eNB. The result of the Link adaptation is, for example, the MCS, the number of Repetitions, the transmission power, the transmission bandwidth, and so forth. The reporting may be performed by higher layer signaling, or may be performed by L1 signaling. By finding the result of the Link adaptation with the receiving UE, the base station eNB can determine the resource amount to be allocated to the transmission buffer for the transmitting UE based on the result of the Link adaptation. For example, if high-speed transmission is possible, a large resource amount can be allocated.

<Device Configuration of the Second Embodiment: User Equipment>

Figure 20:
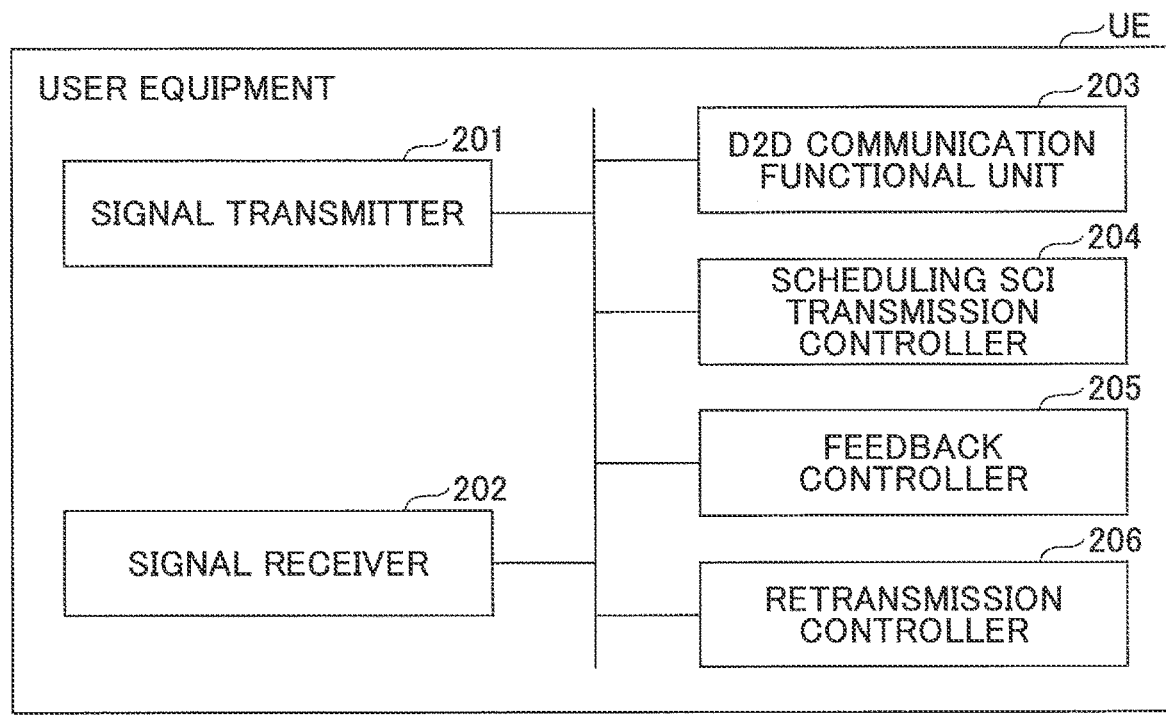
FIG. 20 is a configuration diagram of the user equipment UE according to the second embodiment.

FIG. 20 shows a functional configuration diagram of the user equipment UE according to the embodiment. The UE illustrated in FIG. 20 is a UE that can be any one of the transmitting UE and the receiving UE described in the second embodiment. Additionally, the UE illustrated in FIG. 20 may include a function for implementing the operation of the UE described in the first embodiment, and/or a function for implementing the operation of the UE described in the third embodiment.

As illustrated in FIG. 20, the user equipment UE includes a signal transmitter 201; a signal receiver 202; a D2D communication functional unit 203; a scheduling SCI transmission controller 204; a feedback controller 205; and a retransmission controller 206. Note that FIG. 20 only illustrates, in the user equipment UE, the functional units particularly related to the embodiment of the present invention; and functions, which are not depicted, for performing at least operation conforming to LTE are also included. Additionally, the functional configuration illustrated in FIG. 20 is merely an example. The functional division and the names of the functional units may be any division and names, as long as the operation of the UE according to the embodiment can be executed.

The signal transmitter 201 includes a function for generating various types of physical layer signals from higher layer signals to be transmitted from the user equipment UE, and for wirelessly transmitting them. Additionally, the signal transmitter 201 has a transmission function of the D2D communication; and a transmission function of the cellular communication.

The signal receiver 202 includes a function for wirelessly receiving various types of signals from any other user equipment UE or the base station eNB, and for retrieving the higher layer signal from the received physical layer signals. The signal receiver 202 has a reception function of the D2D communication; and a reception function of the cellular communication.

The D2D communication functional unit 203 includes a D2D application function; and executes Discovery signal transmission and reception control, and SA/Data transmission and reception control. The scheduling SCI transmission controller 204 executes processing for transmission of the scheduling SCI (SA) (which includes reception of the resource allocation), which is used in the second embodiment. As an example, the scheduling SCI transmission controller 204 creates a signal of the scheduling SCI; and performs signal mapping, etc. of the scheduling SCI for the signal transmitter 201.

The feedback controller 205 executes processing (including transmission and reception of the scheduling SCI) for feedback transmission, which is described in the second embodiment. Additionally, the retransmission controller 206 executes processing for retransmission, which is described in the second embodiment.

<Device Configuration of the Second Embodiment: Base Station>

Figure 21:
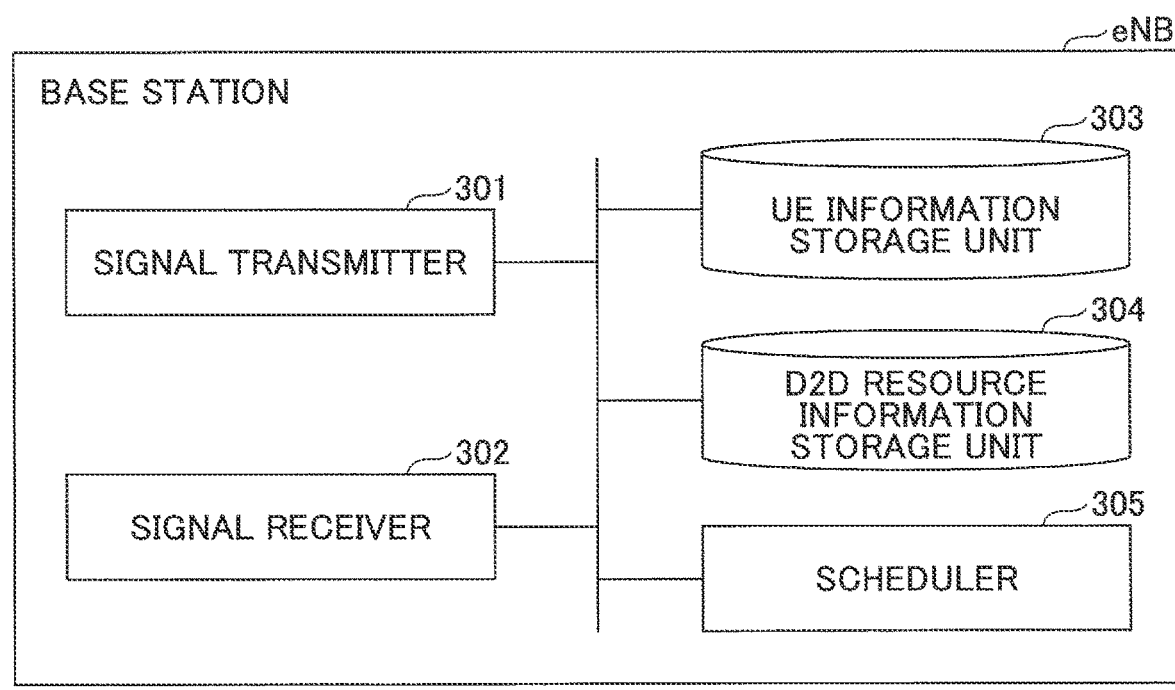
FIG. 21 is a configuration diagram of a base station eNB according to the second embodiment.

FIG. 21 shows a functional configuration diagram of the base station eNB according to the embodiment. Note that the eNB illustrated in FIG. 21 may include a function for implementing the operation of the eNB described in the third embodiment. As shown in FIG. 21, the base station eNB includes a signal transmitter 301; a signal receiver 302; a UE information storage unit 303; a D2D resource information storage unit 304; and a scheduler 305. Note that FIG. 21 only illustrates, in the base station eNB, the functional units particularly related to the embodiment of the present invention; and functions, which are not depicted, for performing at least operation as a base station in the communication system conforming to LTE are also included. Additionally, the functional configuration illustrated in FIG. 21 is merely an example. The functional division and the names of the functional units may be any division and names, as long as the operation according to the embodiment can be executed.

The signal transmitter 301 includes a function for generating various types of physical layer signals from higher layer signals to be transmitted from the base station eNB, and for wirelessly transmitting them. The signal receiver 302 includes a function for wirelessly receiving various types of signals from user equipment UE, and for retrieving the higher layer signal from the received physical layer signals.

The UE information storage unit 303 stores information on UE capabilities received from respective UEs. The D2D resource information storage unit 304 stores, for each UE, information indicating the allocated D2D resource. Furthermore, when the resource is released, the allocation information is deleted. As described by referring to FIG. 17 through FIG. 19, the scheduler 305 has a function for performing resource allocation based on a request and feedback.

Third Embodiment

Next, the third embodiment is described. As described above, the third embodiment relates to feedback setting and feedback type switching, and details are as follows. Note that the third embodiment can be executed in combination with the first embodiment and/or the second embodiment.

Considering UEs (terminals) according to Rel-12 of LTE, it is not always true that all the UEs support the feedback in D2D. Furthermore, the necessity of feedback differs depending on Broadcast/groupcast/unicast, etc.

Accordingly, in the embodiment, for example, for each resource pool, the presence/absence of feedback and the feedback type (the resource configuration examples 1 through 3, etc. of the first embodiment, or may be the presence or absence of bundling, etc.) are configurable. Furthermore, feedback types corresponding to communication types (Broadcast/groupcast/unicast) may be defined in advance; and each UE may determine (set) the feedback type depending on the communication type to be used. Note that the third embodiment is based on the first embodiment (and/or the second embodiment); however, the third embodiment can be separately implemented.

<Processing Procedure 3-1>

Figure 22:
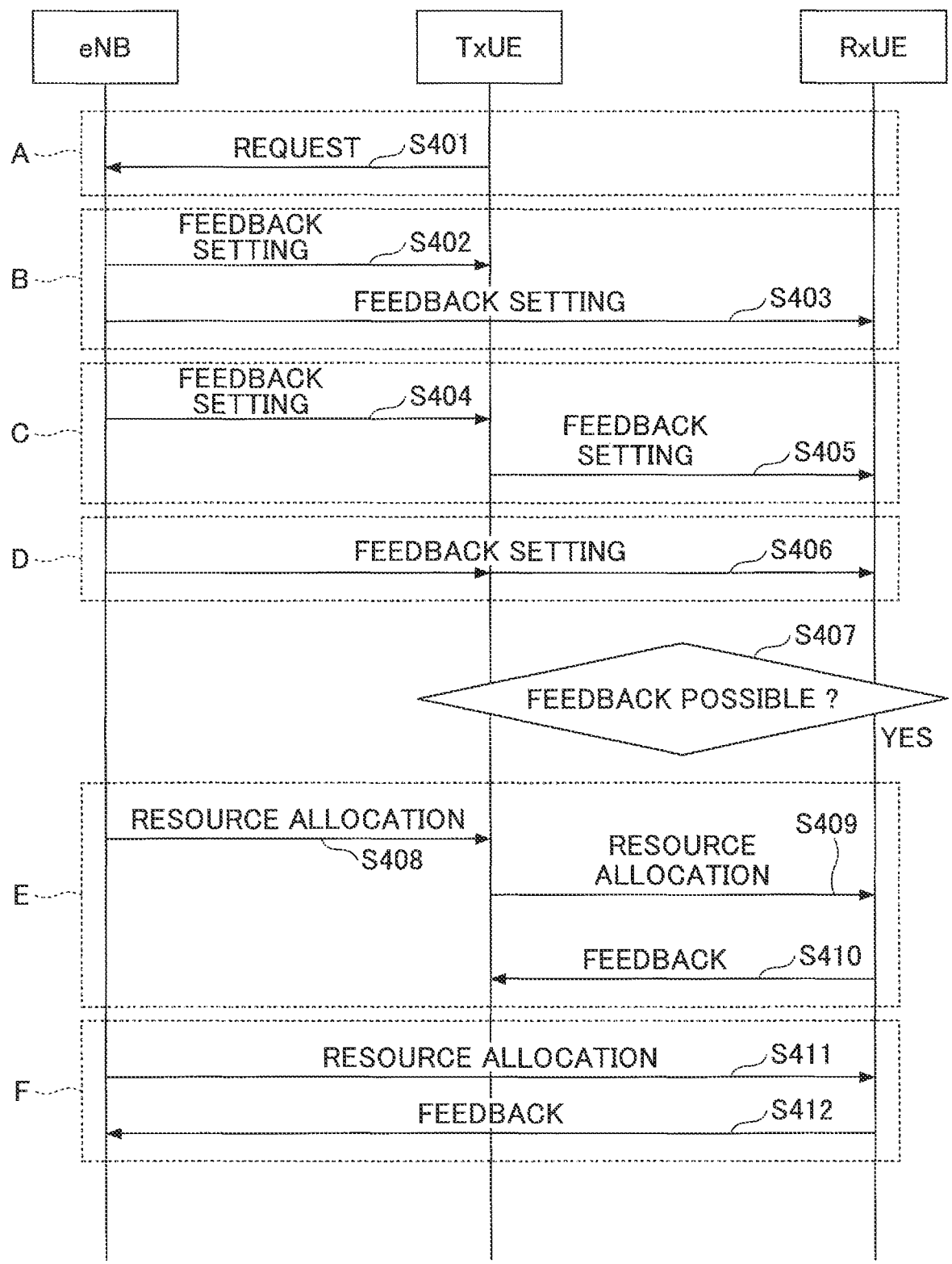
FIG. 22 is a diagram illustrating an example 3-1 of a processing procedure according to a third embodiment.

FIG. 22 illustrates an example of a procedure of a feedback setting (Feedback configuration) by the base station eNB in Mode 1.

In this case, the transmitting UE requests the feedback setting from the base station eNB (step 401). The request may be a request for feedback resource allocation. Based on the request, the base station eNB reports the feedback setting to the UE by signaling. As illustrated in B through D of FIG. 22, as a method of signaling the feedback setting, there are various types of methods. For example, as illustrated in B, the feedback setting may be reported from the base station eNB to each UE; or, as illustrated in C and D, the feedback setting may be reported from the transmitting UE to the receiving UE.

For reporting the feedback setting from the transmitting UE to the receiving UE, the SCI can be used. For example, the feedback setting information is included in the SCI.

When, at step 407, the feedback operation is enabled, for example, as shown in E (steps 408 and 409) and F (step 411), resource allocation for feedback is performed for the receiving UE, and the feedback is performed (step 410 and 412).

<Processing Procedure 3-2>

Figure 23:
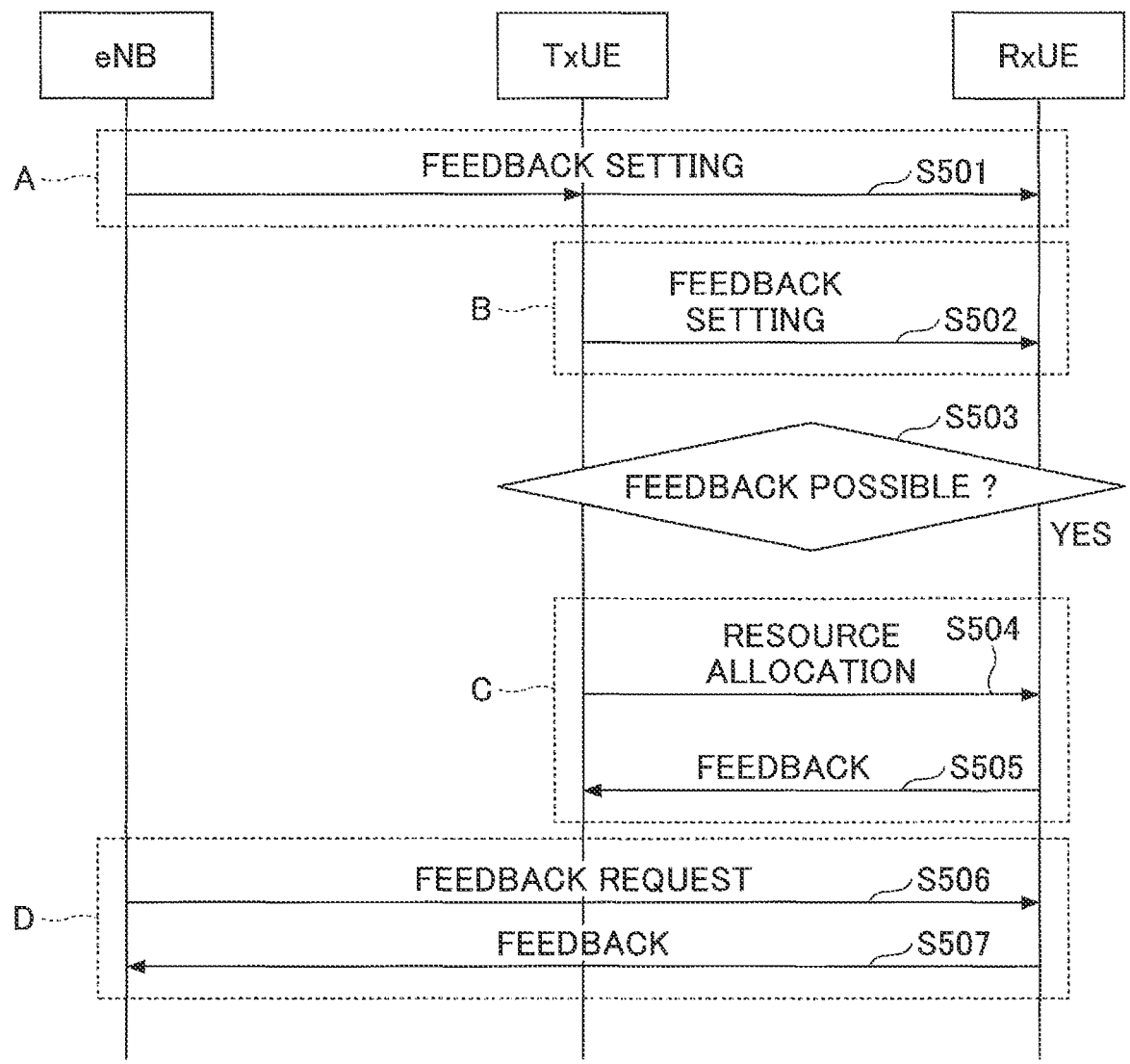
FIG. 23 is a diagram illustrating an example 3-2 of the processing procedure according to the third embodiment.

FIG. 23 shows an example of the procedure of feedback setting (Feedback configuration) by the base station eNB in Mode 2.

In Mode 2, the feedback setting may be reported from the base station eNB to each UE by the system information (SIB) (the process indicated by step 501 of A); or the feedback setting may be reported from the transmitting UE to the receiving UE (the process indicated by step 502 of B).

When, at step 503, the feedback operation is enabled, for example, as illustrated in C (step 504), resource allocation for feedback is performed for the receiving UE, and the feedback is performed (step 505).

By the processing procedure examples 3-1 and 3-2, the feedback setting can be shared among the transmitting UE, the receiving UE, and the eNB, so that proper feedback operation can be implemented.

Note that, as exemplified in F of FIG. 22 and D of FIG. 23, by transmitting resource allocation or a feedback request to the receiving UE, the base station eNB may cause the receiving UE to transmit a feedback signal (e.g., the CSI), and the base station eNB may receive the feedback signal.

Another Detailed Example

In the third embodiment, the receiving UE may switch the feedback format (synonymous with feedback type) of the feedback signal, depending on the configuration of the resource pool to be used, the number of the transmission subframes of Data, and so forth. As an example, the receiving UE can switch the presence/absence of ACK/NACK bundling, depending on the maximum number of the transmission subframes of Data (the number of the subframes that can be transmitted) that can be transmitted from the receiving UE. For example, the receiving UE (the UE transmitting the feedback) can make a determination such that, when the maximum number of the transmission subframes is less than a predetermined number, the ACK/NACK bundling is applied; and, when the maximum number of the transmission subframes is greater than or equal to the predetermined number, the ACK/NACK bundling is not applied. In this manner, the overheads due to feedback can be optimized, depending on the subframes of Data that can be transmitted.

Furthermore, the receiving UE may determine whether to report only the ACK/NACK, or to report it while including the reception quality, depending on the request for the CSI received from the transmitting UE. For example, even if the CSI request is received, if it is determined that the CSI report is unnecessary (example: a case where a predetermined time has not elapsed from the previous CSI transmission), only the ACK/NACK may be reported. In this manner, when the CSI report is unnecessary, the detection accuracy of ACK/NACK in the transmitting UE (the UE receiving the feedback) can be enhanced.

Furthermore, the receiving UE may determine whether the ACK/NACK feedback and the CSI feedback are to be independently reported, depending on the request for the CSI received from the transmitting UE. For example, if it is determined that it is necessary to feed back accurate CSI (example: a case where Link adaptation is not properly executed), the ACK/NACK feedback and the CSI feedback may be independently reported. If the CSI is to be independently reported, high precision CSI reporting is allowed.

Furthermore, the receiving UE may use different feedback formats in Unicast/group-cast, respectively. For example, in Groupcast, the ACKs/NACKs that are bundled based on the PUCCH format 1 may be transmitted; and, in Unicast, the high precision ACK/NACK may be transmitted based on the PUCCH format 3.

Furthermore, with respect to the feedback in Group-cast, the feedback format that can be used during Group-cast may be limited to a specific format (example: a format capable of transmitting only ACK/NACK as the feedback), so that only the ACK/NACK can be determined by the transmitting UE (the UE receiving the feedback). Furthermore, in Group-cast, the receiving UE may return the feedback only for a case of NACK. Through such a contrivance, even for a response in which feedback signals from multiple receiving UEs are multiplexed, the transmitting UE of Group-cast can determine whether ACK is reported or NACK is reported.

Furthermore, with respect to the feedback in Group-cast, by performing feedback by multiple UEs with the same resource, increase in interference with an adjacent frequency resource can be avoided. Specifically, for example, multiple feedback resources may be defined, and the receiving UE (the UE transmitting the feedback) may perform transmission of the feedback by randomly selecting a resource. Furthermore, in order to avoid increase in interference, the transmitting UE that detects the interference, or the base station eNB that detects the interference may prohibit the receiving UE from performing the feedback in Group-cast. Furthermore, the receiving UE may not autonomously perform the feedback in Group-cast.

<Device Configuration of the Third Embodiment: User Equipment>

Figure 24:
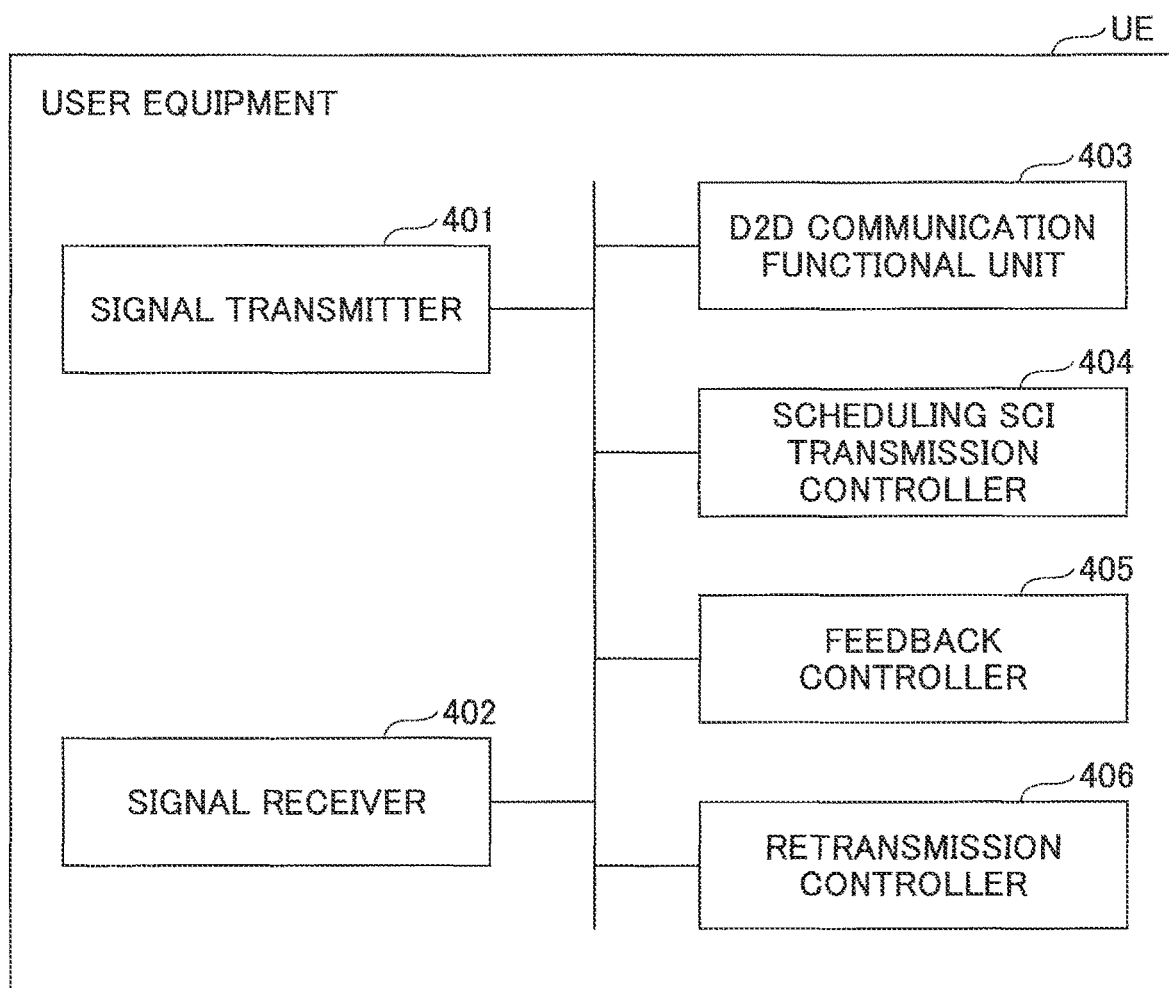
FIG. 24 is a configuration diagram of the user equipment UE according to the third embodiment.

FIG. 24 shows a functional configuration diagram of the user equipment UE according to the embodiment. The UE illustrated in FIG. 24 is a UE that can be any one of the transmitting UE and the receiving UE described in the third embodiment. Additionally, the UE illustrated in FIG. 24 may include a function for implementing the operation of the UE described in the first embodiment, and/or a function for implementing the operation of the UE described in the second embodiment.

As illustrated in FIG. 24, the user equipment UE includes a signal transmitter 401; a signal receiver 402; a D2D communication functional unit 403; a scheduling SCI transmission controller 404; a feedback controller 405; and a retransmission controller 406. Note that FIG. 24 only illustrates, in the user equipment UE, the functional units particularly related to the embodiment of the present invention; and functions, which are not depicted, for performing at least operations conforming to LTE are also included. Additionally, the functional configuration illustrated in FIG. 24 is merely an example. The functional division and the names of the functional units may be any division and names, as long as the operation of the UE according to the embodiment can be executed.

The signal transmitter 401 includes a function for generating various types of physical layer signals from higher layer signals to be transmitted from the user equipment UE, and for wirelessly transmitting them. Additionally, the signal transmitter 401 has a transmission function of the D2D communication; and a transmission function of the cellular communication.

The signal receiver 402 includes a function for wirelessly receiving various types of signals from any other user equipment UE or the base station eNB, and for retrieving the higher layer signal from the received physical layer signals. The signal receiver 202 has a reception function of the D2D communication; and a reception function of the cellular communication.

The D2D communication functional unit 403 includes a D2D application function; and executes Discovery signal transmission and reception control, and SA/Data transmission and reception control. The scheduling SCI transmission controller 404 executes processing for transmission of the scheduling SCI (SA) (which includes reception of the resource allocation), which is used in the third embodiment for retransmission, resource allocation, transmission of the feedback setting, and so forth. As an example, the scheduling SCI transmission controller 404 creates a signal of the scheduling SCI; and performs signal mapping, etc. of the scheduling SCI for the signal transmitter 401.

The feedback controller 405 executes processing (including transmission and reception of the scheduling SCI) for feedback transmission, which is described in the third embodiment. The feedback controller 405 includes a function for receiving the feedback setting, and for setting (configure) the UE based on the setting information. The retransmission controller 406 executes processing for retransmission.

<Device Configuration of the Third Embodiment: Base Station>

Figure 25:
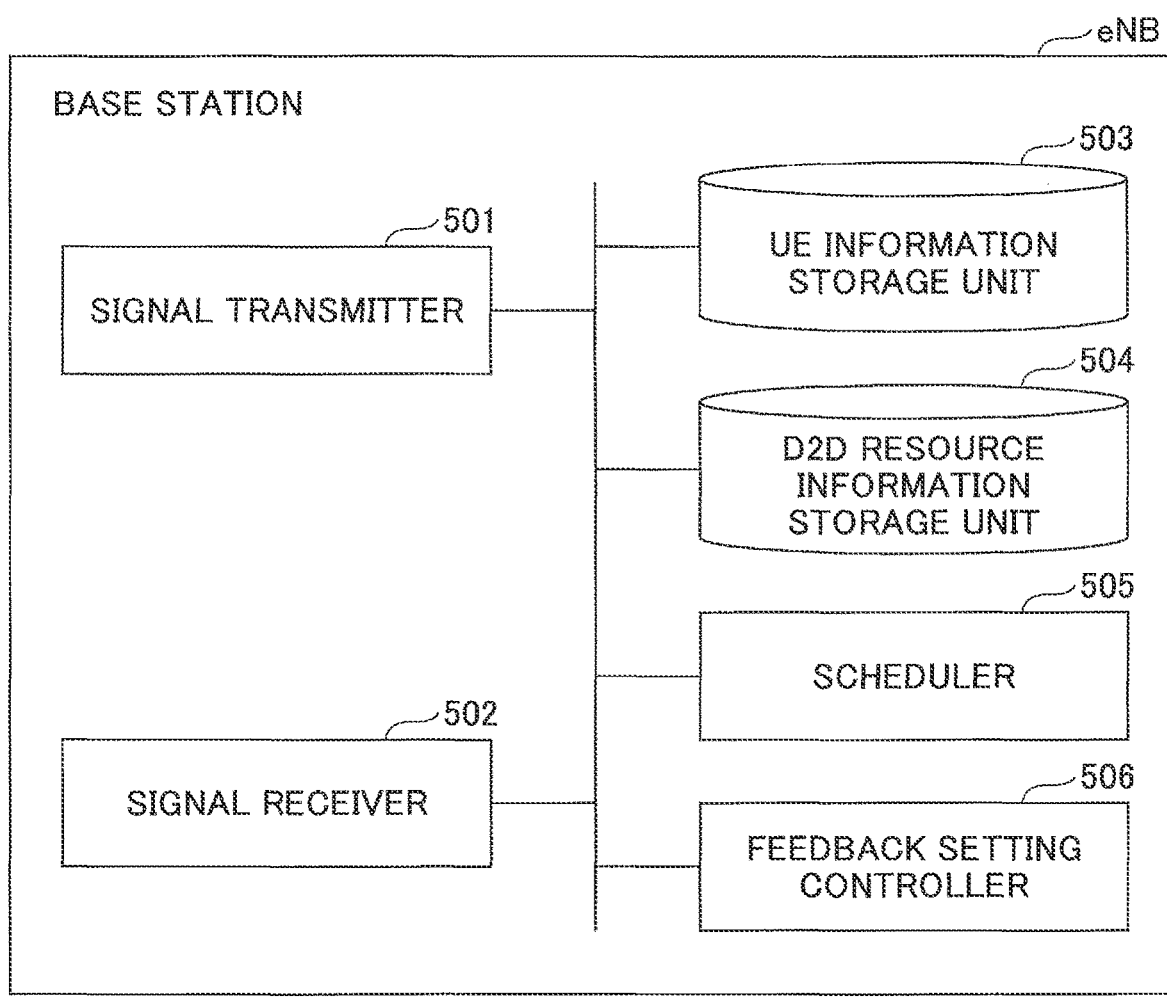
FIG. 25 is a configuration diagram of the base station eNB according to the third embodiment.

FIG. 25 shows a functional configuration diagram of the base station eNB according to the embodiment. Note that the eNB illustrated in FIG. 25 may include a function for implementing the operation of the eNB described in the second embodiment. As shown in FIG. 25, the base station eNB includes a signal transmitter 501; a signal receiver 502; a UE information storage unit 503; a D2D resource information storage unit 504; a scheduler 505; and a feedback setting controller 506. Note that FIG. 25 only illustrates, in the base station eNB, the functional units particularly related to the embodiment of the present invention; and functions, which are not depicted, for performing at least operations as a base station in the communication system conforming to LTE are also included. Additionally, the functional configuration illustrated in FIG. 25 is merely an example. The functional division and the names of the functional units may be any division and names, as long as the operations according to the embodiment can be executed.

The signal transmitter 501 includes a function for generating various types of physical layer signals from higher layer signals to be transmitted from the base station eNB, and for wirelessly transmitting them. The signal receiver 502 includes a function for wirelessly receiving various types of signals from user equipment UE, and for retrieving the higher layer signal from the received physical layer signals.

The UE information storage unit 503 stores information on UE capabilities received from respective UEs. The D2D resource information storage unit 504 stores, for each UE, information indicating the allocated D2D resource. Furthermore, when the resource is released, the allocation information is deleted. The scheduler 505 has a function of performing resource allocation based on a request and feedback. The feedback setting controller 506 includes a function of performing feedback setting according to the present embodiment.

(HW Configuration Examples in First Through Third Embodiments)

The configurations of the user equipment UEs respectively illustrated in FIG. 16, FIG. 20, and FIG. 24 may be entirely implemented by a hardware circuit (example: one or more IC chips); or a part may be implemented by a hardware circuit.

Figure 26:
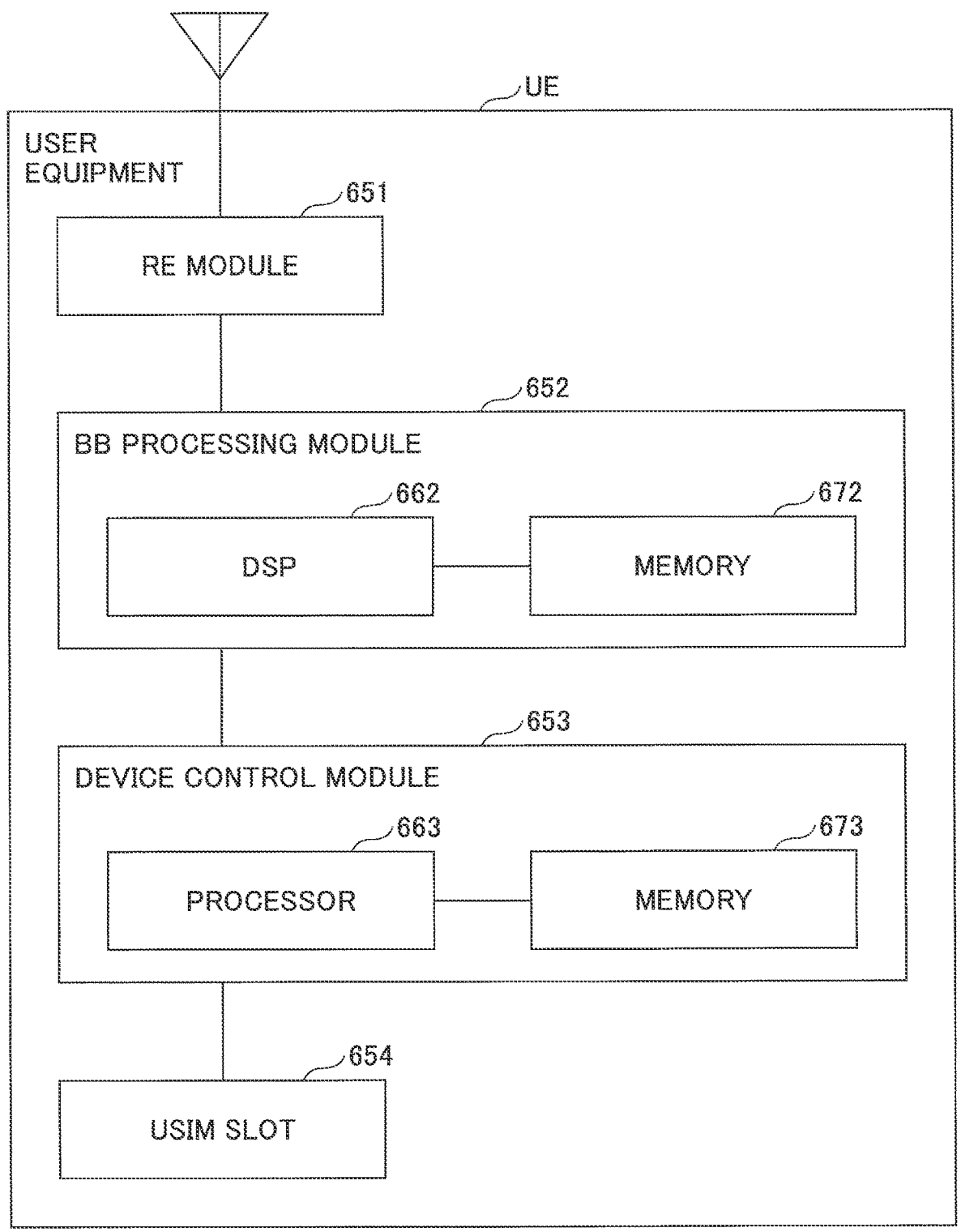
FIG. 26 is a HW configuration diagram of the user equipment UE.

FIG. 26 is a diagram illustrating an example of a hardware (HW) configuration (the configuration that is common among the first through third embodiment) of the user equipment UE. FIG. 26 shows a configuration that is closer to an implementation example compared to the configurations illustrated in FIG. 16, FIG. 20, and FIG. 24. As illustrated in FIG. 26, the UE includes a RE (Radio Equipment) module 651 for performing processing related to radio signals; a BB (Base Band) processing module 652 for performing baseband signal processing; a device control module 653 for performing higher layer processing, etc.; and a USIM slot 654 that is an interface for accessing a USIM card.

The RE module 651 applies D/A (Digital-to-Analog) conversion, modulation, frequency conversion, power amplification, etc. to a digital baseband signal received from the BB processing module 652 to generate a radio signal to be transmitted from an antenna. Furthermore, by applying frequency conversion, A/D (Analog to Digital) conversion, modulation, etc. to the received radio signal, a digital baseband signal is generated, and it is passed to the BB processing module 652. The RE module 651 includes, for example, functions of the physical layer, etc. for the signal transmitter (101, 201, 401) and the signal receiver (102, 202, 401).

The BB processing module 652 performs a process of mutually converting the IP packet and the digital baseband signal. A DSP (Digital Signal Processor) 662 is a processor that performs signal processing in the BB processing module 652. The memory 672 is used as a work area of the DSP 662. The BB processing module 652 includes, for example, functions of the layer 2, etc. for the signal transmitter (101, 201, 401) and the signal receiver (102, 202, 402); the D2D communication functional unit (103, 203, 403); the scheduling SCI transmission controller (104, 204, 404); the feedback controller (105, 205, 405); and retransmission controller (106, 206, 406). Note that all of or a part of the D2D communication functional unit (103, 203, 403), the scheduling SCI transmission controller (104, 204, 404), the feedback controller (105, 205, 405), and retransmission controller (106, 206, 406) may be included in the device control module 653.

The device control module 653 performs IP layer protocol processing, various application processing, and so forth. The processor 663 is a processor that performs processing that is executed by the device control module 653. The memory 673 is used as a work area of the processor 663. Additionally, the processor 663 performs reading out data from and writing data in the USIM through the USIM slot 154. The configuration of the base station eNB illustrated in FIG. 21 and FIG. 25 may be implemented entirely by a hardware circuit (example: one or more IC chips); or a part of which may be formed of a hardware circuit, and the other part may be implemented by a CPU and a program.

Figure 27:
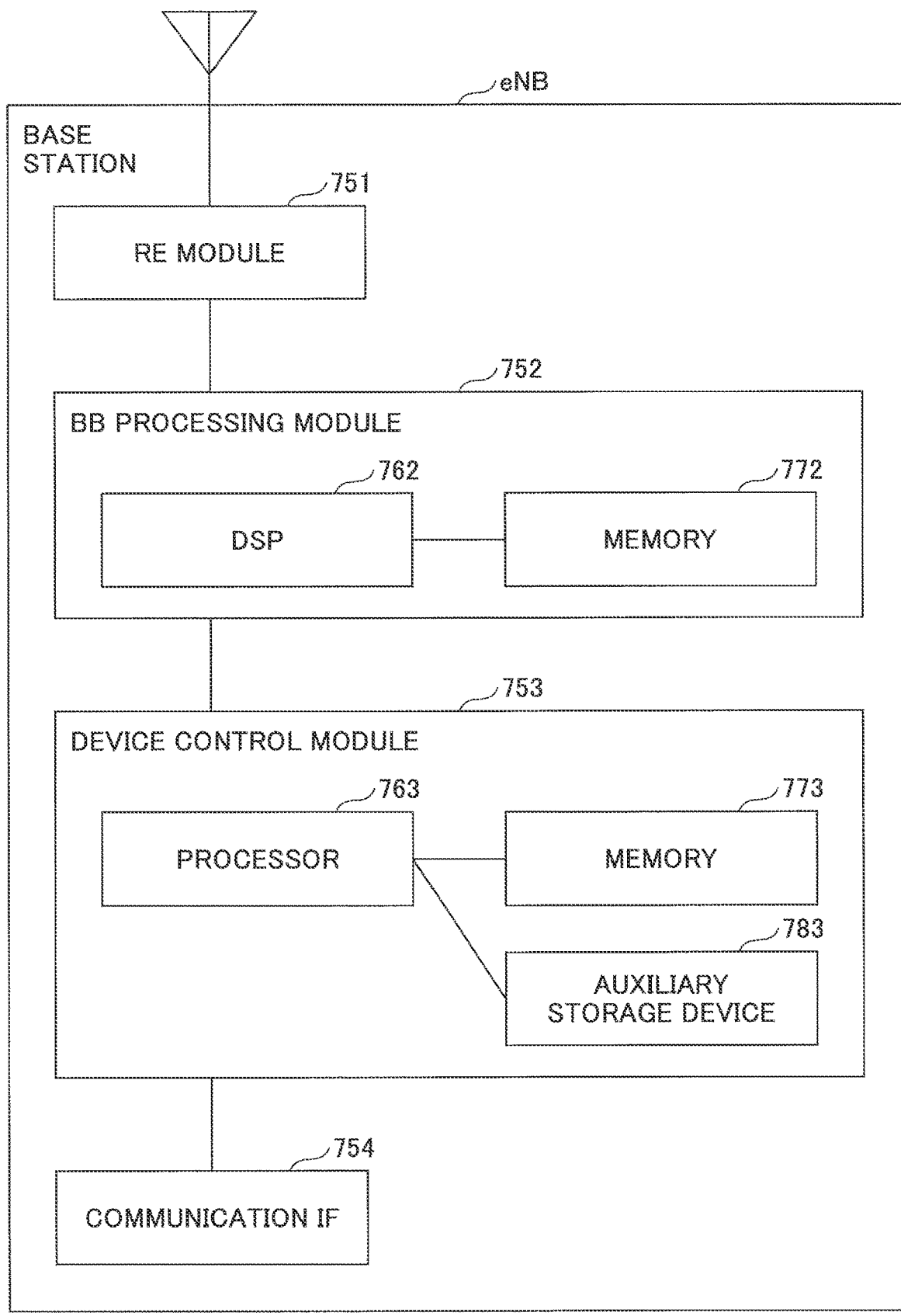
FIG. 27 is a HW configuration diagram of the base station eNB.

FIG. 27 is a diagram illustrating an example of a hardware (HW) configuration (the configuration that is common among the first through third embodiment) of the base station eNB. FIG. 27 shows a configuration that is closer to an implementation example compared to the configurations illustrated in FIG. 21 and FIG. 25. As illustrated in FIG. 27, the base station eNB includes a RE module 751 for performing processing related to radio signals; a BB (Base Band) processing module 752 for performing baseband signal processing; a device control module 753 for performing higher layer processing, etc.; and a communication IF 754 that is an interface for connecting to a network.

The RE module 751 applies D/A conversion, modulation, frequency conversion, power amplification, etc. to a digital baseband signal received from the BB processing module 752 to generate a radio signal to be transmitted from an antenna. Furthermore, by applying frequency conversion, A/D conversion, modulation, etc. to the received radio signal, a digital baseband signal is generated, and it is passed to the BB processing module 752. The RE module 751 includes, for example, functions of the physical layer, etc. for the signal transmitter (301, 501) and the signal receiver (302, 502).

The BB processing module 752 performs a process of mutually converting the IP packets and the digital baseband signals. A DSP (Digital Signal Processor) 762 is a processor that performs signal processing in the BB processing module 752. The memory 772 is used as a work area of the DSP 762. The BB processing module 752 includes, for example, functions of the layer 2, etc. for the signal transmitter (301, 501) and the signal receiver (302, 502); the UE information storage unit (303, 503); the D2D resource information storage unit (304, 504); the scheduler (305, 505); and the feedback setting controller 506. Note that all of or a part of the UE information storage unit (303, 503); the D2D resource information storage unit (304, 504); the scheduler (305, 505); and the feedback setting controller 506 may be included in the device control module 753.

The device control module 753 performs IP layer protocol processing, OAM processing, and so forth. The processor 763 is a processor that performs processing that is executed by the device control module 753. The memory 773 is used as a work area of the processor 763. The auxiliary storage device 783 is, for example, a HDD, etc.; and stores various types of setting information and so forth for the base station eNB itself to operate.

Conclusion of the Embodiments

As described above, according to the embodiments (the first to third embodiments, the same applies hereinafter), there is provided user equipment to be used as receiving user equipment in a mobile communication system supporting D2D communication, the user equipment including a feedback unit that receives a D2D signal from transmitting user equipment, and that transmits, to the transmitting user equipment, a feedback signal with respect to the D2D signal by using a predetermined resource; and a receiver that receives a retransmission D2D signal transmitted from the transmitting user equipment based on the feedback signal.

By the above-described configuration, in the mobile communication system supporting the D2D communication, a technique is provided that allows feedback and retransmission to be performed between the user equipment and the user equipment.

The feedback unit determines the predetermined resource based on, for example, resource information explicitly or implicitly reported from the transmitting user equipment. With such a configuration, a resource for feedback transmission can be appropriately determined.

The feedback unit may determine the predetermined resource based on scheduling control information corresponding to the D2D signal, the scheduling control information being received from the transmitting user equipment. With such a configuration, the resource for feedback transmission can be determined by the scheduling control information corresponding to the D2D signal, which can be a target of retransmission, so that the resource of the feedback signal corresponding to the D2D signal can be quickly determined.

The feedback unit may use, as the predetermined resource, a resource in an SA resource pool or a resource in a resource pool for D2D data transmission. By using the resource in the SA resource pool, the feedback signal can be transmitted as control information; and by using the resource in the resource pool for the D2D data transmission, the feedback signal can be transmitted as data.

The receiver may receive the scheduling control information for reporting a transmission resource of a retransmission D2D signal, prior to receiving the retransmission D2D signal, and the scheduling control information may include information indicating the D2D signal to be retransmitted. With such a configuration, the user equipment can find that the retransmission is to be performed for which D2D signal.

Furthermore, according to the embodiments, there is provided user equipment to be used as transmitting user equipment in a mobile communication system supporting D2D communication, the user equipment including a receiver that receives, from receiving user equipment, a feedback signal with respect to a D2D signal transmitted to the receiving user equipment; and a transmitter that transmits, to the receiving user equipment, a retransmission D2D signal with respect to the D2D signal, based on the feedback signal.

By the above-described configuration, in the mobile communication system supporting the D2D communication, a technique is provided that allows feedback and retransmission to be performed between the user equipment and the user equipment.

The user equipment may include a control information transmitter that transmits, to the receiving user equipment, scheduling control information including transmission resource information of the D2D signal, and the scheduling control information may include resource information to be used for determining a resource for transmitting the feedback signal in the receiving user equipment. With such a configuration, the resource for transmitting the feedback signal can be properly determined in the receiving user equipment.

Furthermore, the control information transmitter may transmit, to the receiving user equipment, the scheduling control information including information indicating the D2D signal to be retransmitted, prior to the retransmission D2D signal being transmitted. With such a configuration, the receiving user equipment can find that retransmission is to be performed for which D2D signal.

Furthermore, in the embodiments, there is provided user equipment including both the units of the above-described transmitting user equipment and the units of the receiving user equipment.

Note that the "unit" in the configuration of each of the above-described devices may be replaced with "part," "circuit," "device," and so forth.

The user equipment UE described in the embodiments may have a configuration such that, it includes a CPU and a memory, and it is implemented by executing a program by the CPU (a processor); a configuration that is implemented by hardware, such as a hardware circuit, including logic for performing the process described in the embodiments; or a configuration in which programs and hardware coexist.

The base station eNB described in the embodiments may have a configuration such that, it includes a CPU and a memory, and it is implemented by executing a program by the CPU (a processor); a configuration that is implemented by hardware, such as a hardware circuit, including logic for performing the process described in the embodiments; or a configuration in which programs and hardware coexist.

The embodiments of the present invention are described above; however the disclosed invention is not limited to the embodiments, and a person ordinarily skilled in the art will appreciate various variations, modifications, alternatives, replacements, and so forth. Specific examples of numerical values are used in the description in order to facilitate understanding of the invention; however, these numerical values are merely an example, and any other appropriate values may be used, except as indicated otherwise. The separations of the items in the above description are not essential to the present invention; and depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of description, the user equipment UE and the base station eNB are described by using the functional block diagrams; however, such devices may be implemented in hardware, software, or combinations thereof. Each of the software to be executed by the processor included in the user equipment UE in accordance with the embodiment of the present invention and the software to be executed by the processor included in the base station eNB in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present invention is not limited to the above-described embodiment; and various variations, modifications, alternatives, replacements, and so forth are included in the present invention without departing from the spirit of the present invention.

LIST OF REFERENCE SYMBOLS eNB: base station
UE: user equipment
101: signal transmitter
102: signal receiver
103: D2D communication functional unit
104: scheduling SCI transmission controller
105: feedback controller
106: retransmission controller
201: signal transmitter
202: signal receiver
203: D2D communication functional unit
204: scheduling SCI transmission controller
205: feedback controller
206: retransmission controller
301: signal transmitter
302: signal receiver
303: UE information storage unit
304: D2D resource information storage unit
305: scheduler
401: signal transmitter
402: signal receiver
403: D2D communication functional unit
404: scheduling SCI transmission controller
405: feedback controller
406: retransmission controller
501: signal transmitter
502: signal receiver
503: UE information storage unit
504: D2D resource information storage unit
505: scheduler
06: feedback setting controller
651: RE module
652: BB processing module
653: device control module
654: USIM slot
751: RE module
752: BB processing module
753: device control module
754: communication IF

The invention claimed is:

1. A terminal comprising:
a receiver that receives sidelink control information and data in sidelink; and
a transmitter that transmits a feedback signal corresponding to the data on a sidelink feedback channel,
wherein a plurality of candidates for a resource for feedback transmission is determined, and the transmitter changes a resource used for feedback transmission depending on a Layer 1 Identity (L1 ID) included in the sidelink control information, and
wherein the transmitter transmits a sequence, that includes a parameter related to a cyclic shift, multiplexed with the feedback signal.

2. The terminal according to claim 1,
wherein, when the receiver receives the sidelink control information including a CSI request, the transmitter performs CSI reporting in sidelink.

3. The terminal according to claim 2,
wherein the transmitter reports CQI or RI, as the CSI.

4. The terminal according to claim 1,
wherein the receiver receives, from a base station, configuration information of a resource pool, the configuration information being configured with presence or absence of feedback.

5. The terminal according to claim 1,
wherein, when the feedback signal only includes NACK, the transmitter transmits the feedback signal.

6. The terminal according to claim 1,
wherein the receiver receives configuration information of a resource for sidelink feedback through RRC signaling.

7. The terminal according to claim 1,
wherein the correspondence between the sidelink control information and the resource for feedback is preconfigured in the terminal.

8. A terminal comprising:
a transmitter that transmits sidelink control information and data in sidelink; and
a receiver that receives a feedback signal for the data on a sidelink feedback channel,
wherein a plurality of candidates for a resource for feedback transmission is determined, and the receiver receives the feedback signal in a resource changed depending on a Layer 1 Identity (L1 ID) included in the sidelink control information, and
wherein the receiver receives a sequence, that includes a parameter related to a cyclic shift, multiplexed with the feedback signal.

9. The terminal according to claim 8,
wherein the transmitter transmits, based on the feedback signal received by the receiver, a feedback signal through a PUCCH.

10. The terminal according to claim 8,
wherein the transmitter transmits a scheduling request to a base station, and sidelink transmission is performed using a resource assigned by the base station.

11. The terminal according to claim 8, wherein the receiver receives, from a base station, a DCI for sidelink scheduling, and the DCI includes a retransmission index, an NDI, and a feedback transmission resource indicator.

12. A system comprising:

a first terminal that includes a receiver that receives sidelink control information and data in a sidelink, and a transmitter that transmits a feedback signal for the data on a sidelink feedback channel, wherein a plurality of candidates for a resource for feedback transmission is determined, and the transmitter changes a resource used for feedback transmission depending on a Layer 1 Identity (L1 ID) included in the sidelink control information, and wherein the transmitter transmits a sequence, that includes a parameter related to a cyclic shift, multiplexed with the feedback signal; and a second terminal that includes a transmitter that transmits the sidelink control information and the data in the sidelink, and a receiver that receives the feedback signal for the data on the sidelink feedback channel.

13. A feedback method executed by a terminal, the method comprising:

receiving sidelink control information and data in a sidelink; and transmitting a feedback signal corresponding to the data on a sidelink feedback channel, wherein a plurality of candidates for a resource for feedback transmission is determined, and the transmitting changes a resource used for feedback transmission depending on a Layer 1 Identity (L1 ID) included in the sidelink control information, and wherein a sequence is transmitted, that includes a parameter related to a cyclic shift, multiplexed with the feedback signal.

14. A feedback method executed by a terminal, the method comprising:

transmitting sidelink control information and data in a sidelink; and receiving a feedback signal corresponding to the data on a sidelink feedback channel, wherein a plurality of candidates for a resource for feedback transmission is determined, and the receiving receives the feedback signal in a resource changed depending on a Layer 1 Identity (L1 ID) included in the sidelink control information, and wherein a sequence is received, that includes a parameter related to a cyclic shift, multiplexed with the feedback signal.

\* \* \* \* \*